United States Patent
Sadusk et al.

(10) Patent No.: US 11,420,393 B2
(45) Date of Patent: Aug. 23, 2022

(54) SUPPORT FABRICATION TECHNIQUES IN THREE-DIMENSIONAL PRINTING

(71) Applicant: MakerBot Industries, LLC, Brooklyn, NY (US)

(72) Inventors: Joseph Sadusk, New York, NY (US); Filipp Gelman, Staten Island, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 9 days.

(21) Appl. No.: 16/272,438

(22) Filed: Feb. 11, 2019

(65) Prior Publication Data

US 2019/0217526 A1 Jul. 18, 2019

Related U.S. Application Data

(63) Continuation of application No. 14/303,450, filed on Jun. 12, 2014, now Pat. No. 10,201,929.

(60) Provisional application No. 61/834,392, filed on Jun. 12, 2013.

(51) Int. Cl.

| | |
|---|---|
| *B29C 64/106* | (2017.01) |
| *B29C 64/386* | (2017.01) |
| *B33Y 10/00* | (2015.01) |
| *B33Y 50/02* | (2015.01) |
| *B29C 64/40* | (2017.01) |
| *B29C 64/118* | (2017.01) |
| *B29K 55/02* | (2006.01) |
| *B29K 423/00* | (2006.01) |

(52) U.S. Cl.
CPC .......... *B29C 64/386* (2017.08); *B29C 64/118* (2017.08); *B29C 64/40* (2017.08); *B33Y 10/00* (2014.12); *B33Y 50/02* (2014.12); *B29K 2055/02* (2013.01); *B29K 2423/065* (2013.01)

(58) Field of Classification Search
CPC ................................... B29C 67/0055
USPC ........................................ 700/98
See application file for complete search history.

(56) References Cited

U.S. PATENT DOCUMENTS

| | | | |
|---|---|---|---|
| 2014/0175706 A1* | 6/2014 | Kritchman | B33Y 10/00 264/401 |
| 2014/0371895 A1 | 12/2014 | Sadusk et al. | |
| 2016/0207263 A1* | 7/2016 | Gordon | B33Y 30/00 |

OTHER PUBLICATIONS

Durant, "Dave Durant's Blog Configuring Skeinforge: Some Basic Terms . . ." (http://davedurant.wordpress.com/2010/10/17/configuring-skeinforge-some-basic-terms) Oct. 17, 2010 (Year: 2010).*
Yu, "How to 3D print peel-able supportive raft/base/platform with slicer3r" Blog Post (https://zavax.wordpress.com/2013/04/24/how-to-3d-print-peel-able-supportive-raft-base-platform-with-slic3r/) Posted Apr. 24, 2013. (Year: 2013).*
Delta Micro Factory Corporation, "PP3DP UP! Mini User Manual" 2012, 44 Pg (Year: 2012).*

(Continued)

*Primary Examiner* — Emilio J Saavedra
(74) *Attorney, Agent, or Firm* — Strategic Patents, P.C.

(57) ABSTRACT

The strength of a bond between two adjacent layers of a three-dimensional print is weakened by initiating fabrication of a top layer at a height greater than the processing height for the print. This technique may be used in particular at the interface between a raft or other support and an object being fabricated, after which the printing process may return to a regular process height for additional layers used to fabricate the remainder of the object.

20 Claims, 16 Drawing Sheets

(56) References Cited

OTHER PUBLICATIONS

Ecker, "Skeinforge Quicktip: The Raft, Part 1" http://blog.thingiverse.com/2009/07/14/skeinforge-quicktip-the-raft-part-1/ Jun. 19, 2012 (Year: 2012).*

Makerbot Forum, Remove Object from the raft Makerbot Forums thread and posts (http://makerbot.wikidot.com/forum/t-335015/remove-object-from-the-raft) Mar. 22-26, 2011 (Year: 2011).*

Scheider, "Skeinforge for RapMan" http://edutechwiki.unige.ch/en/Skeinforge_for_RapMan Jun. 8, 2012 (Year: 2012).*

BFB, "BFB RapMan 3.2 Operations Manual" Nov. 23, 2011, 47 Pgs (Year: 2011).*

Chilton, "Thing-O-Matic Mk7 PLA Set-up and Troubleshooting (Likely Mk8)" http://www.protoparadigm.com/news-updates/thingomatic-mk7-pla-setup-and-troubleshooting-likely-mk8/ Apr. 7, 2012 (Year: 2012).*

Printbot Forum, "Heated bed temperature forum post" http://www.printrbottalk.com/forum/viewtopic.php?f=15&t=356 May 2012 (Year: 2012).*

"HydraRaptor: My attempts to make a rapid prototyping machine that I will use to make parts for a machine that will be able to make parts for a copy of itself." Nop head Blog (http://hydraraptor.blogspot.com/2012/08/peel-able-support.html) Aug. 15, 2012 (13 pgs PDF) (Year: 2012).*

"First object layer is poor" MakerBot Operators thread and posts (https://groups.google.com/forum/#?topic/makerbot/1xishbKICO4) Sep. 20-22, 2010 (5 pgs PDF) (Year: 2010).*

3D Printing Systems, "UP Mini 3D Printer User Manual" 2012, 56 Pgs. (Year: 2012).*

Tiertime, "PLA sticking to raft" Tiertime Community Board Forum, Nov. 2012 (https://www.tiertime.com/community/viewtopic.php?t=1991), 5 page PDF printout (Year: 2012).*

Johnson, "Solidoodle Tips 3D Printing with Solidoodle 2" posted Jul. 30, 2012 accessed at https://solidoodletips.woldpress.com/2012/07/30/slic3r/ (8 pg. print out) (Year: 2012).*

Johnson "Setting the Flow Rate" https://solidoodletips.wordpress.com/2012/08/16/setting-the-flow-rate/ Aug. 16, 2012, 10 page printout (Year: 2012).*

"More Skeinforge" Bits from Bytes official blog https://web.archive.org/web/20111010075118/http://rapmanv3.blogspot.com/2009/09/more-skienforge.html Sep. 25, 2009, 5 page printout (Year: 2009).*

Pham et al., "A comparison of rapid prototyping technologies" International Journal of Machine Tools & Manufacture 38 (1998) pp. 1257-1287 (Year: 1998).*

"First Object Layer is Poor", Makerbot Operators thread and posts (https://groups.google.com/d/topic/makerbot/1xishbKICO4/discussion) Sep. 2010, 6 pages.

RepRapper, "HydraRaptor, Peel-able support", Aug. 15, 2012, 14 Pages.

"HydraRaptor:My attempts to make a rapid prototyping machine that I will use to make parts for a machine that will be able to make parts for a copy of itself", Nop head blog (http://hydraraptor.blogspot.com/2012/08/peel-able-support.html) Aug. 15, 2012, 13 pages.

Schneider, Daniel K., "Skeinforge for RapMan", http://edutechwiki.unige.ch/en/Skeinforge_for_RapMan Jun. 8, 2012, 27 pages.

Ecker, Alan, "Skeinforge Quicktip: The Raft, Part 1", http://blog.thingiverse.com/2009/07/14/skeinforge-quicktip-the-raft-part-1/ 6/19/12, 6 pages.

Edutech, "Netfabb engine for RepRap", http://edutechwiki.unige.ch/mediawiki/index.php?title=Netfabb_engine_for_RepRap&oldid=39809 Jun. 12, 2012, 26 pages.

Printbot Talk Forum, "Heated bed temperature forum post", http://www.printrbottalk.com/forum/viewtopic.php?f=15&t=356 May 2012, 10 pages.

Chilson, Luke, "Thing-O-Matic Mk7 PLA Set-up and Troubleshooting (Likely MK8)", http://www.proroparadigm.com/news-updates/thingomatic-mk7-pla-setup-and-troubleshooting-likely-mk8/ Apr. 7, 2012, 21 pages.

"Object sticks to raft like_to a_ (use your own words)", RepRap thread and posts (https://reprap.org/forum/read.php?1,78098) Mar. 24, 2011, 2 pages.

"Remove Object from the raft", Makerbot Forums thread and posts (http://makerbot.wikidot.com/forum/t-335015/remove-object-from-the-raft) Mar. 22, 2011, 3 pages.

Kecman, "Pillar Based Raft—the new approach to raft printing by netfabb", video accessed at https://www.youtube.com/watch?v=n2lnm7p9VK4 Mar. 12, 2010, 4 pages.

"First Layer Over Interface Printing Issues", Makerbot operators thread and posts (https://groups.google.com/forum/#ltopic/makerbot/977QN1VBxp4) Feb. 2012, 3 pages.

"Skeinforge 35 first layer height issues with both raft and raftless.", Makerbot Operators thread and posts (https://groups.google.com/d/topic/makerbot/v2eJahNDkvU/discussion) Feb. 2011, 8 pages.

BFB, "BFB RapMan 3.2 Operations Manual", Nov. 23, 2011, 47 pages.

Durant, Dave, "Dave Durant's Blog Configuring Skeinforge: Some Basic Terms", http://davedurant.wordpress.com/2010/10/17/configuring-skeinforge-some-basic-terms Oct. 17, 2010, 4 pages.

USPTO, "U.S. Appl. No. 14/303,450 Non-Final Office Action dated Apr. 20, 2018", 24 pages.

USPTO, "U.S. Appl. No. 14/303,450 Notice of Allowance dated Sep. 20, 2018", 7 pages.

USPTO, "U.S. Appl. No. 14/303,450, Final Office Action dated Jun. 2, 2017", 24 pages.

USPTO, "U.S. Appl. No. 14/303,450, Non-Final Office Action dated Nov. 22, 2016", 21 pages.

* cited by examiner

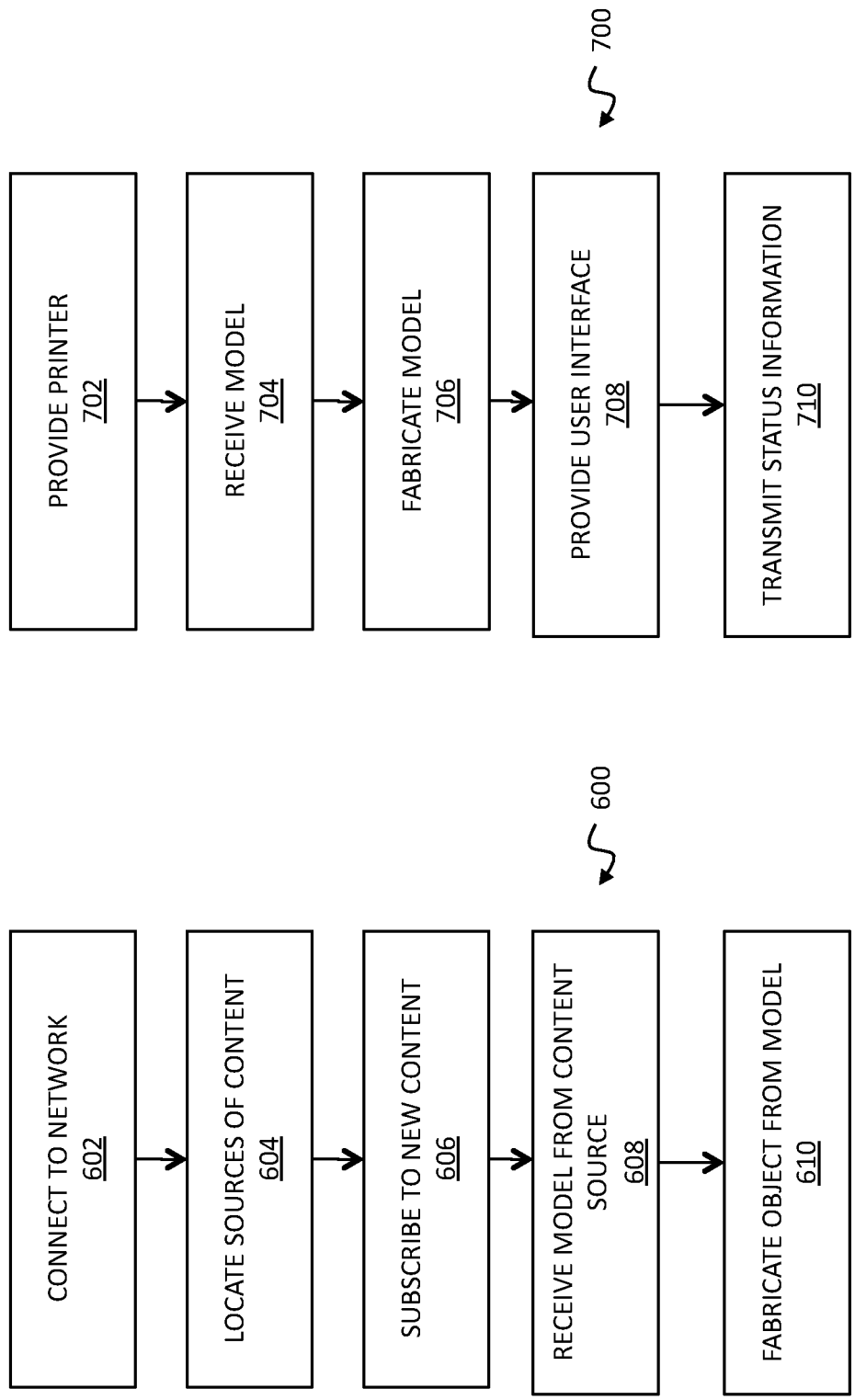

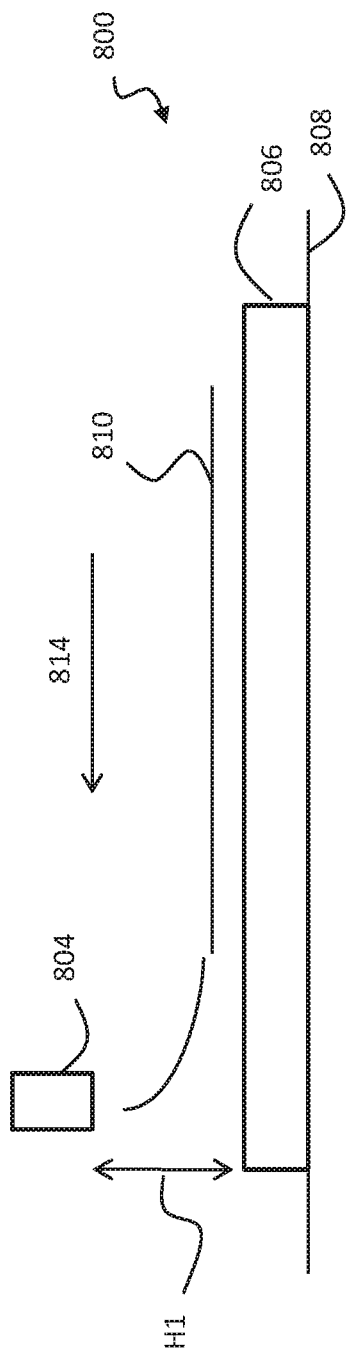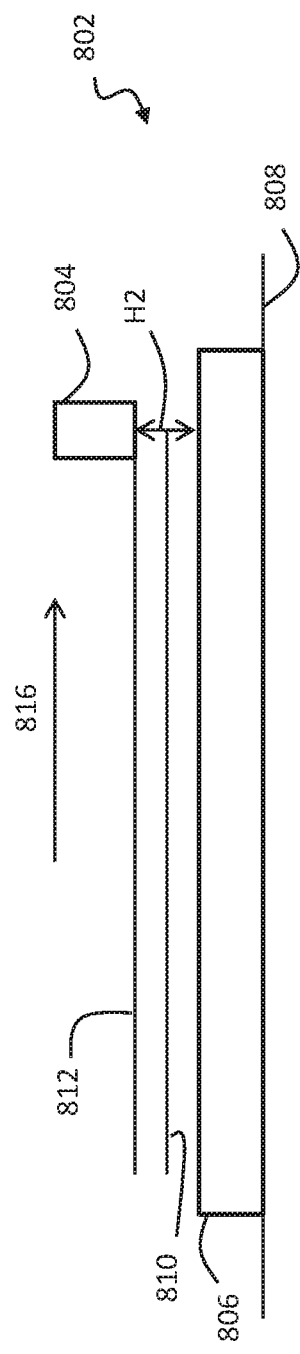

SUPPORT FABRICATION TECHNIQUES IN THREE-DIMENSIONAL PRINTING

RELATED APPLICATIONS

This application is a continuation of U.S. patent application Ser. No. 14/303,450 filed on Jun. 12, 2014 (now U.S. Pat. No. 10,201,929), which claims the benefit of U.S. App. No. 61/834,392 filed on Jun. 12, 2013, the entire content of which is hereby incorporated by reference.

TECHNICAL FIELD

The present disclosure generally relates to three-dimensional fabrication, and more specifically to various systems and methods to improve three-dimensional printing and devices for same.

BACKGROUND

Rafts may be used in a three-dimensional printing process for automatic leveling and to prevent warping of an object being printed. Essentially, a raft is a platform for an object that is fabricated on another surface prior to the object itself in order to provide a consistent surface on which to initiate fabrication. A typical raft is printed from the same build material as the object using a regular grid of spaced apart roads. This provides a level surface of material that can bond to the object while reducing the surface area of contact between the raft and the object. While this works adequately, there is still a strong bond formed between the raft and the object at some locations, which can necessitate additional finishing steps for removal. Additionally, the spacing between segments of the raft may cause drooping as a road from the object bridges from segment to segment of the raft. There remains a need for improved rafts for use in three-dimensional printing.

SUMMARY

The strength of a bond between two adjacent layers of a three-dimensional print is weakened by initiating fabrication of a top layer at a height greater than the processing height for the print. This technique may be used in particular at the interface between a raft or other support and an object being fabricated, after which the printing process may return to a regular process height for additional layers used to fabricate the remainder of the object.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 6 is a flowchart of a method for operating a three-dimensional printer coupled to a network.

FIG. 7 is a flowchart of a method for operating a three-dimensional printer coupled to a network.

FIG. 8A illustrates fabrication of a raft for a three-dimensional printing process.

FIG. 8B illustrates fabrication of a raft for a three-dimensional printing process.

DETAILED DESCRIPTION

Figure 1:
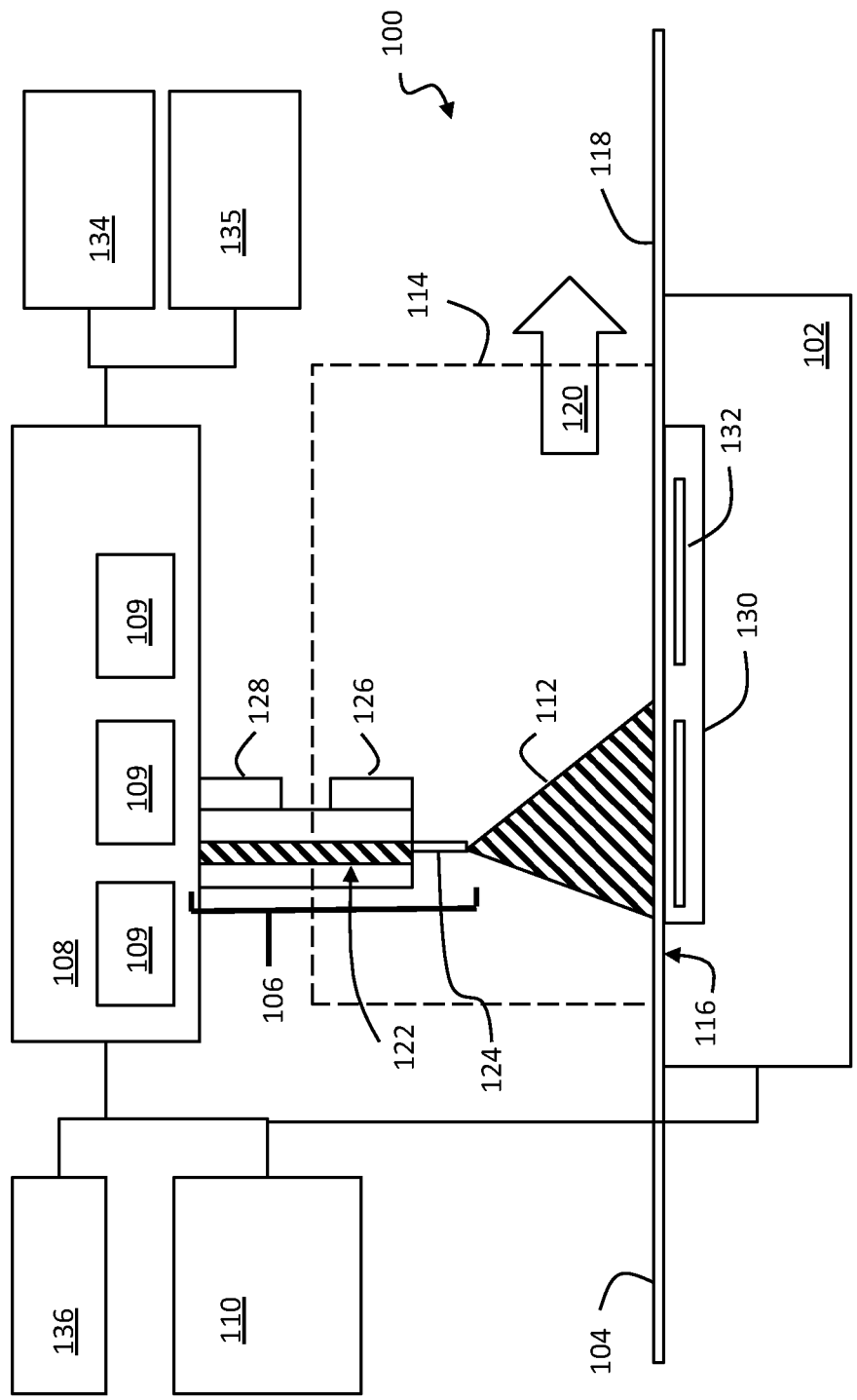
FIG. 1 is a block diagram of a three-dimensional printer.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms Described herein are devices, systems, and methods for using three-dimensional printers, including using networked three-dimensional printers, creating rafts for use in a three-dimensional printing process, slicing techniques, curved layer printing techniques, techniques for spurs, and smoothing techniques. It will be understood that while the exemplary embodiments below emphasize fabrication techniques using extrusion, the principles of the invention may be adapted to a wide variety of three-dimensional fabrication processes, and in particular additive fabrication processes including without limitation selective laser sintering, fused deposition modeling, three-dimensional printing, and the like. All such variations that can be adapted to use with a networked fabrication resource as described herein are intended to fall within the scope of this disclosure. It should also be understood that any reference herein to a fabrication process such as printing or three-dimensional printing is intended to refer to any and all such additive fabrication process unless a different meaning is explicitly stated or otherwise clear from the context. Thus by way of example and not of limitation, a three-dimensional printer (or simply "printer") is now described that may be used in a networked three-dimensional printing environment.

FIG. 1 is a block diagram of a three-dimensional printer. In general, the printer 100 may include a build platform 102, a conveyor 104, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may support the conveyer 104 in order to provide a fixed, dimensionally and positionally stable platform on which to build the object 112.

The build platform 102 may include a thermal element 130 that controls the temperature of the build platform 102 through one or more active devices 132 such as resistive elements that convert electrical current into heat, Peltier effect devices that can create a heating or cooling affect, or any other thermoelectric heating and/or cooling devices. Thus the thermal element 130 may be a heating element that provides active heating to the build platform 102, a cooling element that provides active cooling to the build platform 102, or a combination of these. The heating element 130 may be coupled in a communicating relationship with the controller 110 in order for the controller 110 to controllably impart heat to or remove heat from the surface 116 of the build platform 102. Thus the thermal element 130 may include an active cooling element positioned within or adjacent to the build platform 102 to controllably cool the build platform 102.

It will be understood that a variety of other techniques may be employed to control a temperature of the build platform 102. For example, the build platform 102 may use a gas cooling or gas heating device such as a vacuum chamber or the like in an interior thereof, which may be quickly pressurized to heat the build platform 102 or vacated to cool the build platform 102 as desired. As another example, a stream of heated or cooled gas may be applied directly to the build platform 102 before, during, and/or after a build process. Any device or combination of devices suitable for controlling a temperature of the build platform 102 may be adapted to use as the thermal element 130 described herein.

The conveyer 104 may be formed of a sheet 118 of material that moves in a path 120 through the working volume 114. Within the working volume 114, the path 120 may pass proximal to the surface 116 of the build platform 102—that is, resting directly on or otherwise supported by the surface 116—in order to provide a rigid, positionally stable working surface for a build. It will be understood that while the path 120 is depicted as a unidirectional arrow, the path 120 may be bidirectional, such that the conveyer 104 can move in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyor may include a motor or other similar drive mechanism (not shown) coupled to the controller 110 to control movement of the sheet 118 of material along the path 120. Various drive mechanisms are shown and described in further detail below.

In general, the sheet 118 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 118 may have a thickness of about three to seven thousandths of an inch, or any other thickness that permits the sheet 118 to follow the path 120 of the conveyer 104. For example, with sufficiently strong material, the sheet 118 may have a thickness of one to three thousandths of an inch. The sheet 118 may instead be formed of sections of rigid material joined by flexible links.

A working surface of the sheet 118 (e.g., an area on the top surface of the sheet 118 within the working volume 114) may be treated in a variety of manners to assist with adhesion of build material to the surface 118 and/or removal of completed objects from the surface 118. For example, the working surface may be abraded or otherwise textured (e.g., with grooves, protrusions, and the like) to improve adhesion between the working surface and the build material.

A variety of chemical treatments may be used on the working surface of the sheet 118 of material to further facilitate build processes as described herein. For example, the chemical treatment may include a deposition of material that can be chemically removed from the conveyer 104 by use of water, solvents, or the like. This may facilitate separation of a completed object from the conveyer by dissolving the layer of chemical treatment between the object 112 and the conveyor 104. The chemical treatments may include deposition of a material that easily separates from the conveyer such as a wax, mild adhesive, or the like. The chemical treatment may include a detachable surface such as an adhesive that is sprayed on to the conveyer 104 prior to fabrication of the object 112.

In one aspect, the conveyer 104 may be formed of a sheet of disposable, one-use material that is fed from a dispenser and consumed with each successive build.

In one aspect, the conveyer 104 may include a number of different working areas with different surface treatments adapted for different build materials or processes. For example, different areas may have different textures (smooth, abraded, grooved, etc.). Different areas may be formed of different materials. Different areas may also have or receive different chemical treatments. Thus a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 124 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 to melt the build material for extrusion. The extruder 106 may also or instead include a motor 128 or the like to push the build material into the chamber 122 and/or through the extrusion tip 126.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. As noted above, other techniques may be employed for three-dimensional printing, including extrusion-based techniques using a build material that is curable and/or a build material of sufficient viscosity to retain shape after extrusion.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. Any such arrangement suitable for controllably positioning the extruder 106 within the working volume 114 may be adapted to use with the printer 100 described herein.

By way of example and not limitation, the conveyer 104 may be affixed to a bed that provides x-y positioning within the plane of the conveyor 104, while the extruder 106 can be independently moved along a z-axis. As another example, the extruder 106 may be stationary while the conveyor 104 is x, y, and z positionable. As another example, the extruder 106 may be x, y, and z positionable while the conveyor 104 remains fixed (relative to the working volume 114). In yet another example, the conveyor 104 may, by movement of the sheet 118 of material, control movement in one axis (e.g., the y-axis), while the extruder 106 moves in the z-axis as well as one axis in the plane of the sheet 118. Thus in one aspect, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyer 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through the network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor or the like embedded within or attached below the surface of the build platform 102. This may also or instead include an infrared detector or the like directed at the surface 116 of the build platform 102 or the sheet 118 of material of the conveyer 104. Other sensors that may be usefully incorporated into the printer 100 as the sensor 134 include a heat sensor, a volume flow rate sensor, a weight sensor, a sound sensor, and a light sensor. Certain more specific examples are provided below by way of example and not of limitation.

The sensor 134 may include a sensor to detect a presence (or absence) of the object 112 at a predetermined location on the conveyer 104. This may include an optical detector arranged in a beam-breaking configuration to sense the presence of the object 112 at a location such as an end of the conveyer 104. This may also or instead include an imaging device and image processing circuitry to capture an image of the working volume 114 and analyze the image to evaluate a position of the object 112. This sensor 134 may be used for example to ensure that the object 112 is removed from the conveyor 104 prior to beginning a new build at that location on the working surface such as the surface 116 of the build platform 102. Thus the sensor 134 may be used to determine whether an object is present that should not be, or to detect when an object is absent. The feedback from this sensor 134 may be used by the controller 110 to issue processing interrupts or otherwise control operation of the printer 100.

The sensor 134 may include a sensor that detects a position of the conveyer 104 along the path. This information may be obtained from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may include a heater (instead of or in addition to the thermal element 130) to heat the working volume 114 such as a radiant heater or forced hot air to maintain the object 112 at a fixed, elevated temperature throughout a build. The sensor 134 may also or instead include a cooling element to maintain the object 112 at a predetermined sub-ambient temperature throughout a build.

The sensor 134 may also or instead include at least one video camera. The video camera may generally capture images of the working volume 114, the object 112, or any other hardware associated with the printer 100. The video camera may provide a remote video feed through the network interface 136, which feed may be available to remote users through a user interface maintained by, e.g., remote hardware such as the print servers described below with reference to FIG. 3, or within a web page provided by a web server hosted by the three-dimensional printer 100. Thus in one aspect there is disclosed herein a user interface adapted to present a video feed from at least one video camera of a three-dimensional printer to a remote user through a user interface.

The sensor 134 may include may also include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 114. In another aspect, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including without limitation pass/fail decisions, error detection (and corresponding audible or visual alerts), shape detection, position detection, orientation detection, collision avoidance, and so forth.

Other components, generically depicted as other hardware 135, may also be included, such as input devices including a keyboard, touchpad, mouse, switches, dials, buttons, motion sensors, and the like, as well as output devices such as a display, a speaker or other audio transducer, light emitting diodes, and so forth. Other hardware 135 may also or instead include a variety of cable connections and/or hardware adapters for connecting to, e.g., external computers, external hardware, external instrumentation or data acquisition systems, and so forth.

The printer 100 may include, or be connected in a communicating relationship with, a network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple into a local area network or the like that is in turn coupled to a data network such as the Internet. This may also or instead include hardware/software for a WiMAX connection or a cellular network connection (using, e.g., CDMA, GSM, LTE, or any other suitable protocol or combination of protocols). Consistently, the controller 110 may be configured to control participation by the printer 100 in any network to which the network interface 136 is connected, such as by autonomously connecting to the network to retrieve printable content, or responding to a remote request for status or availability. Networked uses of the printer 100 are discussed in greater detail below.

Figure 2:
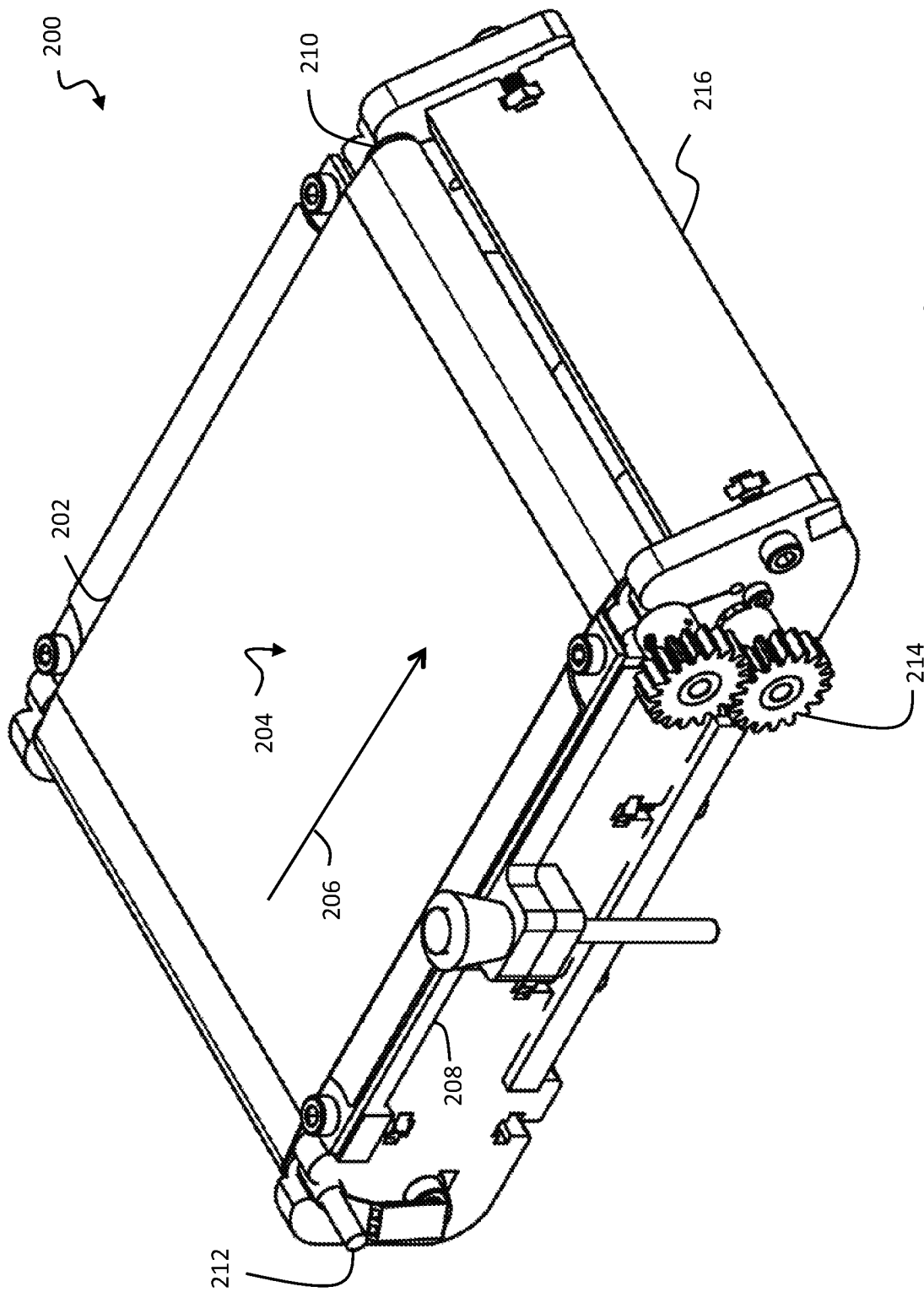
FIG. 2 is an isometric view of a conveyer for an automated build process.

FIG. 2 is an isometric view of a conveyer for an automated build process. The conveyer 200 may include a sheet 202 of material that provides a working surface 204 for three-dimensional fabrication. As depicted, the conveyer may form a continuous path 206 about a build platform 208 by arranging the sheet 202 as a belt or the like. Thus for example, the path 206 may move parallel to the surface of the build platform 208 along the top of the build platform 208 (from left to right in FIG. 2). The sheet 202 may then curve downward and around a roller 210 and reverse direction underneath the build platform 208, returning again at an opposing roller 212 to form a loop about the build platform 208.

The roller 210 may be coupled by gears 214 or the like to a motor (not shown) to move the sheet 202 of material. The motor may be controlled by a controller (such as the controller 110 described above) to control movement of the sheet 202 of material in a build process.

The conveyer 200 may include a scraper 216 to physically separate a completed object from the conveyer 200 based upon a relative movement of the sheet 202 of material of the conveyor 200 to the scraper 216. In general, adhesion of an object to a working surface maintains the object within the coordinate system of the printer during a build in order to facilitate the build process. Where good adhesion is achieved during a build, dislodging the completed object from the working surface may require significant force. Thus in order to ensure the availability of a continuous working surface, the conveyer 200 may enforce physical separation of the object from the working surface by passing the sheet 202 of material by the scraper 216 to dislodge the object. While the scraper 216 is depicted below the working surface of the sheet 202, it will be readily understood that a variety of positions and orientations of the scraper 216 may achieve similar results. Thus for example, the scraper 216 may extend vertically above or below the sheet 202, horizontally from the sheet 202, or in any other suitable orientation. It will also be appreciated that while the scraper 216 is depicted in an orientation perpendicular to the path 206, the scraper 216 may be angled in order to also urge a completed object off the sheet 202 in any desired direction, such as to a side of the working surface where a chute or receptacle may be provided to catch and store the completed object. In some embodiments, the conveyor 200 may transport the object to a side of the printer 100, or alternatively the entire conveyor 200 assembly may be moved outside the printer, so that urging the completed object off the sheet 202 also causes the competed object to depart the printer 100. The term 'scraper' should be understood as referring in a non-limiting sense to any physical fixture that might be employed to remove an object from the sheet 202, and that many other shapes, sizes, orientations, and the like may also or instead be employed as the scraper 216 described herein without departing from the scope of this disclosure.

In one aspect, the conveyer 200 may support networked use of the printer 100 by permitting fabrication of multiple, consecutive parts under control by a remote computer without user intervention.

Figure 3:
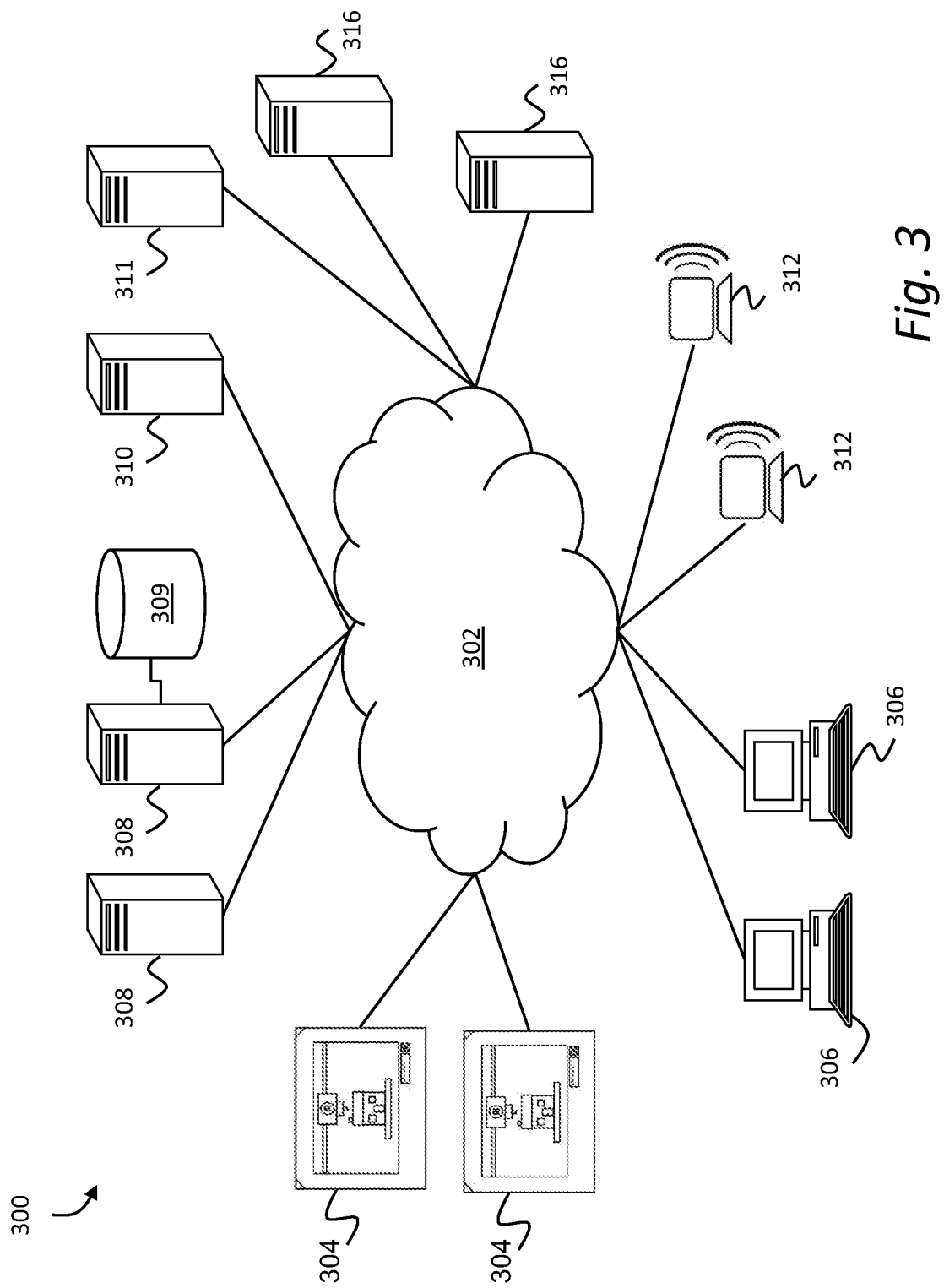
FIG. 3 depicts a networked three-dimensional printing environment.

FIG. 3 depicts a networked three-dimensional printing environment. In general, the environment 300 may include a data network 302 interconnecting a plurality of participating devices in a communicating relationship. The participating devices may, for example, include any number of three-dimensional printers 304 (also referred to interchangeably herein as "printers"), client devices 306, print servers 308, content sources 310, mobile devices 314, and other resources 316.

The data network 302 may be any network(s) or internetwork(s) suitable for communicating data and control information among participants in the environment 300. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMAX-Advanced (IEEE 802.16m), as well as any of a variety of corporate area or local area networks and other switches, routers, hubs, gateways, and the like that might be used to carry data among participants in the environment 300.

The three-dimensional printers 304 may be any computer-controlled devices for three-dimensional fabrication, including without limitation any of the three-dimensional printers or other fabrication or prototyping devices described above. In general, each such device may include a network interface comprising, e.g., a network interface card, which term is used broadly herein to include any hardware (along with software, firmware, or the like to control operation of same) suitable for establishing and maintaining wired and/or wireless communications. The network interface card may include without limitation wired Ethernet network interface cards ("NICs"), wireless 802.11 networking cards, wireless 802.11 USB devices, or other hardware for wireless local area networking. The network interface may also or instead include cellular network hardware, wide area wireless network hardware or any other hardware for centralized, ad hoc, peer-to-peer, or other radio communications that might be used to carry data. In another aspect, the network interface may include a serial or USB port used to directly connect to a computing device such as a desktop computer that, in turn, provides more general network connectivity to the data network 302.

Client devices 306 may in general be devices within the environment 300 operated by users to initiate and monitor print jobs at the three-dimensional printers 304. This may include desktop computers, laptop computers, network computers, tablets, or any other computing device that can participate in the environment 300 as contemplated herein. Each client device 306 generally provides a user interface, which may include a graphical user interface and/or text or command line interface to control operation of remote three-dimensional printers 304. The user interface may be maintained by a locally executing application on one of the client devices 306 that receives data and status information from, e.g., the printers 304 and print servers 308 concerning pending or executing print jobs, and creates a suitable display on the client device 306 for user interaction. In other embodiments, the user interface may be remotely served and presented on one of the client devices 306, such as where a print server 308 or one of the three-dimensional printers 304 includes a web server that provides information through one or more web pages or the like that can be displayed within a web browser or similar client executing on one of the client devices 306.

The print servers 308 may include data storage, a network interface, and a processor or other processing circuitry. In the following description, where the functions or configuration of a print server 308 are described, this is intended to included corresponding functions or configuration (e.g., by programming) of a processor of the print server 308. In general, the print servers 308 (or processors thereof) may perform a variety of processing tasks related to management of networked printing. For example, the print servers 308 may manage print jobs received from one or more of the client devices 306, and provide related supporting functions such as content search and management. A print server 308 may also include a web server that provides web-based access by the client devices 306 to the capabilities of the print server 308. A print server 308 may also communicate periodically with three-dimensional printers 304 in order to obtain status information concerning, e.g., availability of printers and/or the status of particular print jobs, any of which may be subsequently presented to a user through the web server. A print server 308 may also maintain a list of available three-dimensional printers 304, and may automatically select one of the three-dimensional printers 304 for a user-submitted print job, or may permit a user to specify a single printer, or a group of preferred printers, for fabricating an object. Where the print server 308 selects the printer automatically, any number of criteria may be used such as geographical proximity, printing capabilities, current print queue, fees (if any) for use of a particular three-dimensional printer 304, and so forth. Where the user specifies criteria, this may similarly include any relevant aspects of three-dimensional printers 304, and may permit use of absolute criteria (e.g., filters) or preferences, which may be weighted preferences or unweighted preferences, any of which may be used by a print server 308 to allocate a print job to a suitable resource.

Other user preferences may be usefully stored at the print server 308 to facilitate autonomous, unsupervised fabrication of content from content sources 310. For example, a print server 308 may store a user's preference on handling objects greater than a build volume of a printer. These preferences may control whether to resize the object, whether to break the object into multiple sub-objects for fabrication, and whether to transmit multiple sub-objects to a single printer or multiple printers. In addition, user preferences or requirements may be stored, such as multi-color printing capability, build material options and capabilities, and so forth. More generally, the print queue may be managed by a print server 308 according to one or more criteria from a remote user requesting a print job. The print server 308 may also store user preferences or criteria for filtering content, e.g., for automatic printing or other handling. While this is described below as a feature for autonomous operation of a printer (such as a printer that locally subscribes to a syndicated model source), any criteria that can be used to identify models of potential interest by explicit type (e.g., labeled in model metadata), implicit type (e.g., determined based on analysis of the model), source, and so forth, may be provided to the print server 308 and used to automatically direct new content to one or more user-specified ones of the three-dimensional printers 304.

In one aspect, the processor of the print server may be configured to store a plurality of print jobs submitted to the web server in a log and to provide an analysis of print activity based on the log. This may include any type of analysis that might be useful to participants in the environment 300. For example, the analysis may include tracking of the popularity of particular objects, or of particular content sources. The analysis may include tracking of which three-dimensional printers 304 are most popular or least popular, or related statistics such as the average backlog of pending print jobs at a number of the three-dimensional printers 304. More generally, any statistics or data may be obtained, and any analysis may be performed, that might be useful to users (e.g., when requesting prints), content sources (e.g., when choosing new printable objects for publication), providers of fabrication resources (e.g., when setting fees), or network facilitators such as the print servers 308.

A print server 308 may also maintain a database 309 of content, along with an interface for users at client devices 306 to search the database 309 and request fabrication of objects in the database 309 using any of the three-dimensional printers 304. Thus in one aspect, a print server 308 (or any system including the print server 308) may include a database 309 of three-dimensional models, and the print server 308 may act as a server that provides a search engine for locating a particular three-dimensional model in the database 309. The search engine may be a text-based search engine using keyword text queries, plain language queries, and so forth. The search engine may also or instead include an image-based search engine configured to identify three-dimensional models similar to a two-dimensional or three-dimensional image provide by a user.

In another aspect, the printer server 308 may periodically search for suitable content at remote locations on the data network, which content may be retrieved to the database 309, or have its remote location (e.g., a URL or other network location identifier) stored in the database 309. In another aspect, the print server 308 may provide an interface for submission of objects from remote users, along with any suitable metadata such as a title, tags, creator information, descriptive narrative, pictures, recommended printer settings, and so forth. In one aspect, the database 309 may be manually curated according to any desired standards. In another aspect, printable objects in the database 309 may be manually or automatically annotated according to content type, popularity, editorial commentary, and so forth.

The print server 308 may more generally provide a variety of management functions. For example, the print server 304 may store a predetermined alternative three-dimensional printer to execute a print job from a remote user in the event of a failure by the one of the plurality of three-dimensional printers 304. In another aspect, the print server 308 may maintain exclusive control over at least one of the plurality of three-dimensional printers 304, such that other users and/or print servers cannot control the printer. In another aspect, the print server 308 may submit a print job to a first available one of the plurality of three-dimensional printers 304.

In another aspect, a print server 308 may provide an interface for managing subscriptions to sources of content. This may include tools for searching existing subscriptions, locating or specifying new sources, subscribing to sources of content, and so forth. In one aspect, a print server 308 may manage subscriptions and automatically direct new content from these subscriptions to a three-dimensional printer 304 according to any user-specified criteria. Thus while it is contemplated that a three-dimensional printer 304 may autonomously subscribe to sources of content through a network interface and receive new content directly from such sources, it is also contemplated that this feature may be maintained through a remote resource such as a print server 308.

A print server 308 may maintain print queues for participating three-dimensional printers 304. This approach may advantageously alleviate backlogs at individual printers 304, which may have limited memory capacity for pending print jobs. More generally, a print server 308 may, by communicating with multiple three-dimensional printers 304, obtain a view of utilization of multiple networked resources that permits a more efficient allocation of print jobs than would be possible through simple point-to-point communications among users and printers. Print queues may also be published by a print server 308 so that users can view pending queues for a variety of different three-dimensional printers 304 prior to selecting a resource for a print job. In one aspect, the print queue may be published as a number of print jobs and size of print jobs so that a requester can evaluate likely delays. In another aspect, the print queue may be published as an estimated time until a newly submitted print job can be initiated.

In one aspect, the print queue of one of the print servers 308 may include one or more print jobs for one of the plurality of three-dimensional printers 304. The print queue may be stored locally at the one of the plurality of three-dimensional printers. In another aspect, the print queue may be allocated between the database 309 and a local memory of the three-dimensional printer 304. In another aspect, the print queue may be stored, for example, in the database 309 of the print server 308. As used here, the term 'print queue' is intended to include print data (e.g., the three-dimensional model or tool instructions to fabricate an object) for a number of print job (which may be arranged for presentation in order of expected execution), as well as any metadata concerning print jobs. Thus, a portion of the print queue such as the metadata (e.g., size, status, time to completion) may be usefully communicated to a print server 308 for sharing among users while another portion of the print queue such as the model data may be stored at a printer in preparation for execution of a print job.

Print queues may implement various user preferences on prioritization. For example, for a commercial enterprise, longer print jobs may be deferred for after normal hours of operation (e.g., after 5:00 p.m.), while shorter print jobs may be executed first if they can be completed before the end of a business day. In this manner, objects can be identified and fabricated from within the print queue in a manner that permits as many objects as possible to be fabricated before a predetermined closing time. Similarly, commercial providers of fabrication services may charge explicitly for prioritized fabrication, and implement this prioritization by prioritizing print queues in a corresponding fashion.

In another aspect, a print server 308 may provide a virtual workspace for a user. In this virtual workspace, a user may search local or remote databases of printable objects, save objects of interest (or links thereto), manage pending prints, specify preferences for receiving status updates (e.g., by electronic mail or SMS text), manage subscriptions to content, search for new subscription sources, and so forth. In one aspect, the virtual workspace may be, or may include, web-based design tools or a web-based design interface that permits a user to create and modify models. In one aspect, the virtual workspace may be deployed on the web, while permitting direct fabrication of a model developed within that environment on a user-specified one of the three-dimensional printers 304, thus enabling a web-based design environment that is directly coupled to one or more fabrication resources.

The content sources 310 may include any sources of content for fabrication with a three-dimensional printer 304. This may, for example, include databases of objects accessible through a web interface or application programming interface. This may also or instead include individual desktop computers or the like configured as a server for hosted access, or configured to operate as a peer in a peer-to-peer network. This may also or instead include content subscription services, which may be made available in an unrestricted fashion, or may be made available on a paid subscription basis, or on an authenticated basis based upon some other relationship (e.g., purchase of a related product or a ticket to an event). It will be readily appreciated that any number of content providers may serve as content sources 310 as contemplated herein. By way of non-limiting example, the content sources 310 may include destinations such as amusement parks, museums, theaters, performance venues, or the like, any of which may provide content related to users who purchase tickets. The content sources 310 may include manufacturers such as automobile, computer, consumer electronics, or home appliance manufacturers, any of which may provide content related to upgrades, maintenance, repair, or other support of existing products that have been purchased. The content sources 310 may include artists or other creative enterprises that sell various works of interest. The content sources 310 may include engineering or architectural firms that provide marketing or advertising pieces to existing or prospective customers. The content sources 310 may include marketing or advertising firms that provide promotional items for clients. More generally, the content sources 310 may be any individual or enterprise that provides single or serial objects for fabrication by the three-dimensional printers 304 described herein.

One or more web servers 311 may provide web-based access to and from any of the other participants in the environment 300. While depicted as a separate network entity, it will be readily appreciated that a web server 311 may be logically or physically associated with one of the other devices described herein, and may, for example, provide a user interface for web access to one of the three-dimensional printers 304, one of the print servers 308 (or databases 309 coupled thereto), one of the content sources 310, or any of the other resources 316 described below in a manner that permits user interaction through the data network 302, e.g., from a client device 306 or mobile device 312.

The mobile devices 312 may be any form of mobile device, such as any wireless, battery-powered device, that might be used to interact with the networked printing environment 300. The mobile devices 312 may, for example, include laptop computers, tablets, thin client network computers, portable digital assistants, messaging devices, cellular phones, smart phones, portable media or entertainment devices, and so forth. In general, mobile devices 312 may be operated by users for a variety of user-oriented functions such as to locate printable objects, to submit objects for printing, to monitor a personally owned printer, and/or to monitor a pending print job. A mobile device 312 may include location awareness technology such as Global Positioning System ("GPS"), which may obtain information that can be usefully integrated into a printing operation in a variety of ways. For example, a user may select an object for printing and submit a model of the object to a print server, such as any of the print servers described above. The print server may determine a location of the mobile device 312 initiating the print job and locate a closest printer for fabrication of the object.

In another aspect, a printing function may be location-based, using the GPS input (or cellular network triangulation, proximity detection, or any other suitable location detection techniques). For example, a user may be authorized to print a model only when the user is near a location (e.g., within a geo-fenced area or otherwise proximal to a location), or only after a user has visited a location. Thus a user may be provided with printable content based upon locations that the user has visited, or while within a certain venue such as an amusement park, museum, theater, sports arena, hotel, or the like.

The other resources 316 may include any other software or hardware resources that may be usefully employed in networked printing applications as contemplated herein. For example, the other resources 316 may include payment processing servers or platforms used to authorize payment for content subscriptions, content purchases, or printing resources. As another example, the other resources 316 may include social networking platforms that may be used, e.g., to share three-dimensional models and/or fabrication results according to a user's social graph. In another aspect, the other resources 316 may include certificate servers or other security resources for third party verification of identity, encryption or decryption of three-dimensional models, and so forth. In another aspect, the other resources 316 may include online tools for three-dimensional design or modeling, as well as databases of objects, surface textures, build supplies, and so forth. In another aspect, the other resources 316 may include a desktop computer or the like co-located (e.g., on the same local area network with, or directly coupled to through a serial or USB cable) with one of the three-dimensional printers 304. In this case, the other resource 316 may provide supplemental functions for the three-dimensional printer 304 in a networked printing context such as maintaining a print queue or operating a web server for remote interaction with the three-dimensional printer 304. More generally, any resource that might be usefully integrated into a networked printing environment may be one of the resources 316 as contemplated herein.

It will be readily appreciated that the various components of the networked printing environment 300 described above may be arranged and configured to support networked printing in a variety of ways. For example, in one aspect there is disclosed herein a networked computer with a print server and a web interface to support networked three-dimensional printing. This device may include a print server, a database, and a web server as discussed above. The print server may be coupled through a data network to a plurality of three-dimensional printers and configured to receive status information from one or more sensors for each one of the plurality of three-dimensional printers. The print server may be further configured to manage a print queue for each one of the plurality of three-dimensional printers. The database may be coupled in a communicating relationship with the print server and configured to store print queue data and status information for each one of the plurality of three-dimensional printers. The web server may be configured to provide a user interface over the data network to a remote user, the user interface adapted to present the status information and the print queue data for one or more of the plurality of three-dimensional printers to the user and the user interface adapted to receive a print job from the remote user for one of the plurality of three-dimensional printers.

The three-dimensional printer 304 described above may be configured to autonomously subscribe to syndicated content sources and periodically receive and print objects from those sources. Thus in one aspect there is disclosed herein a device including any of the three-dimensional printers described above; a network interface; and a processor (which may without limitation include the controller for the printer). The processor may be configured to subscribe to a plurality of sources of content (such as the content sources 310 described above) selected by a user for fabrication by the three-dimensional printer through the network interface. The processor may be further configured to receive one or more three-dimensional models from the plurality of content sources 310 and to select one of the one or more three-dimensional models for fabrication by the three-dimensional printer 304 according to a user preference for prioritization. The user preference may, for example, preferentially prioritize particular content sources 310, or particular types of content (e.g., tools, games, artwork, upgrade parts, or content related to a particular interest of the user).

The memory of a three-dimensional printer 304 may be configured to store a queue of one or more additional three-dimensional models not selected for immediate fabrication. The processor may be programmed to periodically re-order or otherwise alter the queue according to predetermined criteria or manual user input. For example, the processor may be configured to evaluate a new three-dimensional model based upon a user preference for prioritization, and to place the new three-dimensional model at a corresponding position in the queue. The processor may also or instead be configured to retrieve content from one of the content sources 310 by providing authorization credentials for the user, which may be stored at the three-dimensional printer or otherwise accessible for presentation to the content source 310. The processor may be configured to retrieve content from at least one of the plurality of content sources 310 by authorizing a payment from the user to a content provider. The processor may be configured to search a second group of sources of content (such as any of the content sources 310 described above) according to one or more search criteria provide by a user. This may also or instead include demographic information for the user, contextual information for the user, or any other implicit or explicit user information.

In another aspect, there is disclosed herein a system for managing subscriptions to three-dimensional content sources such as any of the content sources 310 described above. The system may include a web server configured to provide a user interface over a data network, which user interface is adapted to receive user preferences from a user including a subscription to a plurality of sources of a plurality of three-dimensional models, a prioritization of content from the plurality of sources, and an identification of one or more fabrication resources coupled to the data network and suitable for fabricating objects from the plurality of three-dimensional models. The system may also include a database to store the user preferences, and to receive and store the plurality of three-dimensional models as they are issued by the plurality of sources. The system may include a processor (e.g., of a print server 308, or alternatively of a client device 306 interacting with the print server 308) configured select a selected one of the plurality of three-dimensional models for fabrication based upon the prioritization. The system may include a print server configured to communicate with the one or more fabrication resources through the data network, to determine an availability of the one or more fabrication resources, and to transmit the selected one of the plurality of three-dimensional models to one of the one or more fabrication resources.

In another aspect, there is disclosed herein a network of three-dimensional printing resources comprising: a plurality of three-dimensional printers, each one of the plurality of three-dimensional printers including a network interface; a server configured to manage execution of a plurality of print jobs by the plurality of three-dimensional printers; and a data network that couples the server and the plurality of three-dimensional printers in a communicating relationship.

In general as described above, the server may include a web-based user interface configured for a user to submit a new print job to the server and to monitor progress of the new print job. The web-based user interface may permit video monitoring of each one of the plurality of three-dimensional printers, or otherwise provide information useful to a remote user including image-based, simulation-based, textual-based or other information concerning status of a current print. Details of a suitable user interface are discussed in further detail with reference to FIG. 5.

The fabrication resources may, for example, include any of the three-dimensional printers 304 described above. One or more of the fabrication resources may be a private fabrication resource secured with a credential-based access system. The user may provide, as a user preference and prior to use of the private fabrication resource, credentials for accessing the private fabrication resource. In another aspect, the one or more fabrication resources may include a commercial fabrication resource. In this case the user may provide an authorization to pay for use of the commercial fabrication resource in the form of a user preference prior to use of the commercial fabrication resource.

Many current three-dimensional printers require significant manufacturing time to fabricate an object. At the same time, certain printers may include a tool or system to enable multiple, sequential object prints without human supervision or intervention, such as the conveyor belt described above. In this context, prioritizing content may be particularly important to prevent crowding out of limited fabrication resources with low priority content that arrives periodically for autonomous fabrication. As a significant advantage, the systems and methods described herein permit prioritization using a variety of user-specified criteria, and permit use of multiple fabrication resources in appropriate circumstances. Thus prioritizing content as contemplated herein may include any useful form of prioritization. For example, this may include prioritizing the content according to source. The content sources 310 may have an explicit type that specifies the nature of the source (e.g., commercial or paid content, promotional content, product support content, non-commercial) or the type of content provided (e.g., automotive, consumer electronics, radio control hobbyist, contest prizes, and so forth). Prioritizing content may include prioritizing the content according to this type. The three-dimensional models themselves may also or instead include a type (e.g., tool, game, home, art, jewelry, replacement part, upgrade part, etc.), and prioritizing the content may include prioritizing the content according to this type.

In one aspect, the processor may be configured to select two or more of the plurality of three-dimensional models for concurrent fabrication by two or more of the plurality of fabrication resources based upon the prioritization when a priority of the two or more of the plurality of three-dimensional models exceeds a predetermined threshold. That is, where particular models individually have a priority above the predetermined threshold, multiple fabrication resources may be located and employed to fabricate these models concurrently. The predetermined threshold may be evaluated for each model individually, or for all of the models collectively such as on an aggregate or average basis.

In one aspect, the processor may be configured to adjust prioritization based upon a history of fabrication when a number of objects fabricated from one of the plurality of sources exceeds a predetermined threshold. Thus, for example, a user may limit the number of objects fabricated from a particular source, giving subsequent priority to content from other sources regardless of an objectively determined priority for a new object from the particular source. This prevents a single source from overwhelming a single fabrication resource, such as a personal three-dimensional printer operated by the user, in a manner that crowds out other content from other sources of possible interest. At the same time, this may enable content sources 310 to publish on any convenient schedule, without regard to whether and how subscribers will be able to fabricate objects.

In another aspect, the processor may be configured to identify one or more additional sources of content based upon a similarity to one of the plurality of sources of content. For example, where a content source 310 is an automotive manufacturer, the processor may perform a search for other automotive manufactures, related parts suppliers, mechanics, and so forth. The processor may also or instead be configured to identify one or more additional sources of content based upon a social graph of the user. This may, for example, include analyzing a social graph of relationships from the user to identify groups with common interests, shared professions, a shared history of schools or places of employment, or a common current or previous residence location, any of which may be used to locate other sources of content that may be of interest to the user.

Figure 4:
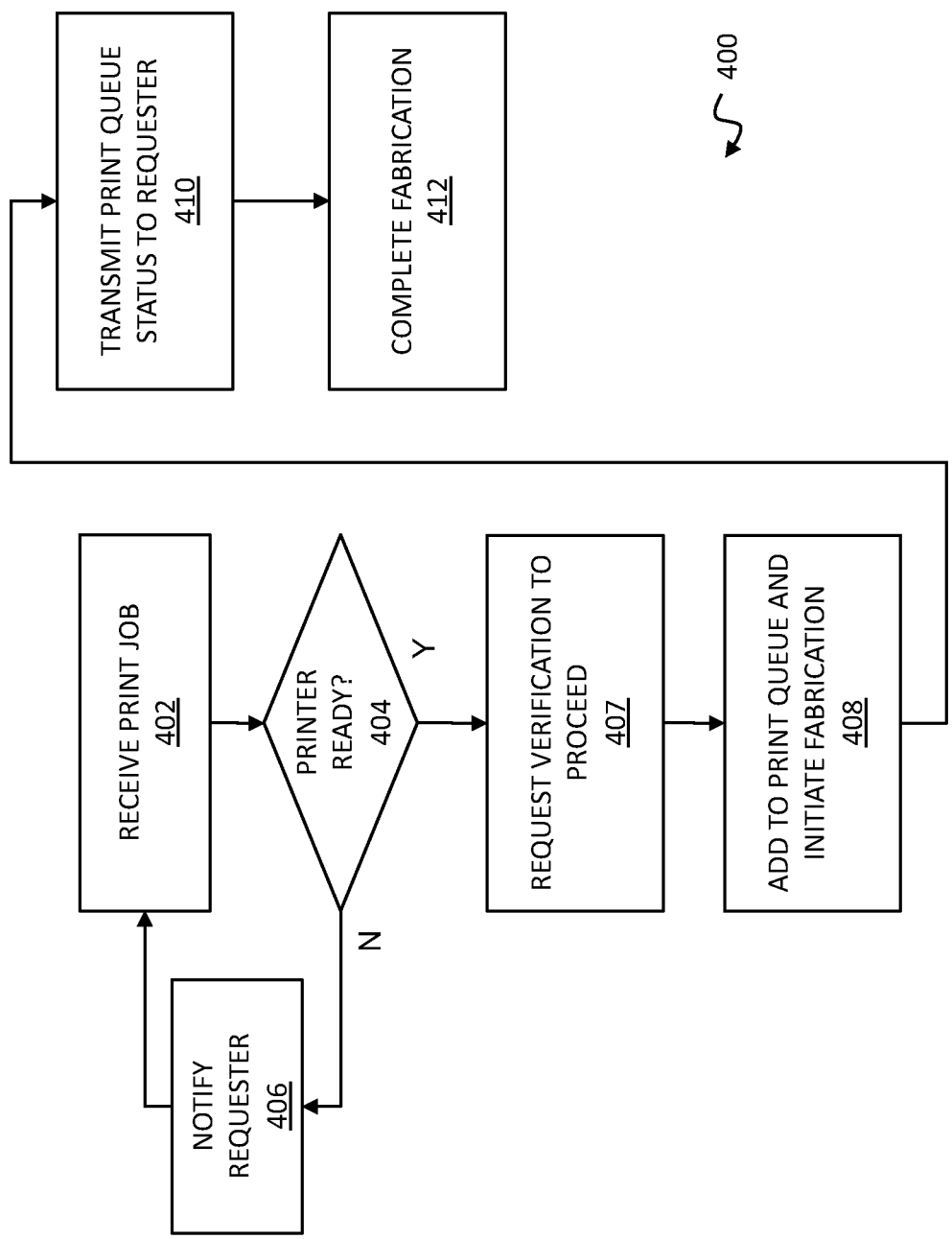
FIG. 4 is a flowchart of a method for using a three-dimensional printer, such as any of the three-dimensional printers described above, when coupled to a data network.

FIG. 4 depicts a method for operating a three-dimensional printer, such as any of the three-dimensional printers described above, when coupled to a data network. As contemplated above, the three-dimensional printer may include a network interface for coupling to the data network, as well as any number of sensors that provide status information for various aspects of the three-dimensional printer, which status information may be communicated over the data network to a remote user or other automated or manual resource in order to monitor submission, progress, and completion of a print job. In general, the printer may operate as an autonomous network device coupled directly to the Internet through a cable mode, router, hub, or the like. In another aspect, the printer may use a computer or other computing resource coupled to the printer through a local area network or the like for steps requiring intensive computation (e.g., converting from a stereolithography or other computer automated design format into tool instructions), substantial storage (e.g., print queue management), or other hardware (e.g., cameras, environmental sensors, and so forth).

As shown in step 402, the method 400 may begin with receiving a print job over the data network, which may include any of the data networks described above. The print job may be received from a requester, which may for example include a remote device (or user of the remote device) such as a laptop or other computer. The requester may be coupled in a communicating relationship to the three-dimensional printer through the data network in a host-client relationship, a peer-to-peer relationship, a mutually hosted relationship (e.g., with both devices hosted by a third networked device) or any other relationship capable of supporting communications and data transfer between the requester and the three-dimensional printer. In another aspect, a user may communicate indirectly with the three-dimensional printer, such as by interacting over the data network with a print server, subscription content source, or any other resource or service that facilitates managed access to the three-dimensional printer over the data network, and acts as the requester to submit the print job.

As shown in step 404, the method 400 may include evaluating an availability of the three-dimensional printer for the print job. This may be based upon a signal from any of the sensors associated with the three-dimensional printer. It will be understood that this evaluation may be performed locally at the three-dimensional printer, with an availability indicator transmitted back to the requester, or this evaluation may be performed remotely by a device that receives sensor data in raw or processed form from the sensor(s) of the three-dimensional printer.

A wide variety of evaluations may be performed. For example, the evaluation may relate to the status of a current job executing on the three-dimensional printer, or an analysis of one or more other jobs in a local queue of the three-dimensional printer, any of which might result in the three-dimensional printer being unavailable. For example, where the printer has a substantial number of queued jobs that will require several hours to fabricate, or that uses all available local memory of the printer, then the printer may be identified as unavailable for additional print jobs. As another example, the evaluation may be based upon other sensors such as thermostats, motion or position error detectors, or optical sensors, any of which might permit inferences concerning the ability of the three-dimensional printer to execute a print job. For example, if an optical sensor detects an object within a working volume of the three-dimensional printer, or if a thermal sensor detects that a print head is not at a suitable temperature (or is not responding correctly to a heating command), the printer may not be ready and a corresponding evaluation may be provided. As another example, a sensor may detect a quantity of build material available to the printer, and a processor on the printer may determine if the supply is inadequate for the requested print job. Thus evaluating the availability of the three-dimensional printer may include accepting the print job only if a supply of build material available for the three-dimensional printer exceeds an amount of build material required for the print job and one or more additional jobs ahead of the requested print job in the queue.

Similarly, any of a variety of status checks for normal, error-free functioning of the three-dimensional printer may be undertaken prior to accepting (or transmitting from a requester) a new print job. More generally, a variety of sensors and other inputs (including, e.g., data that may be stored locally in a memory of the three-dimensional printer) may provide useful information for assessing the availability of the device, and may be used as the sensor(s) contemplated herein to evaluate availability of the three-dimensional printer for a print job.

In one aspect, the evaluation may be based on a receiving state of the three-dimensional printer. The receiving state may be inferred based on various sensor signals and/or data indicative of whether the three-dimensional printer is currently engaged in a print. In another aspect, the receiving state may be explicitly provided by an owner or administrator of the three-dimensional printer, thus providing an opportunity for the administrator to control what level of access to the printing resource will be provided to external users who might connect to the printer over the data network. Thus the receiving state may be selected from a group including, e.g., open, closed, or authenticated. In general, the open receiving state may permit access to any remote user, while the closed receiving state does not permit access to any remote users (such as where the owner wishes to connect to the data network to retrieve remote content, but does not wish to make the three-dimensional printer publicly available). The authenticated receiving state may permit remote access conditioned upon receipt of appropriate credentials. Thus in one aspect, availability may be based upon an identity of a user—the requester—associated with the print job. In this case, evaluating availability of the three-dimensional printer may include assessing an identity of the user, which may be determined, e.g., using access credentials such as a user name and password, a digital certificate, or any other techniques for securely identifying the user, either locally or with reference to a trusted external resource such as a certificate server or the like.

In another aspect, the print job itself may be secured for communication to the three-dimensional printer using, e.g., encryption of print or model data. The printer may in turn conditionally authorize printing according to any related access credentials. Thus in one aspect the method may include securing the print job using a digital rights management technique that restricts execution of the print job to one or more predetermined three-dimensional printers or to a printer having suitable credentials. In this context, evaluating the availability of the three-dimensional printer may include determining whether the three-dimensional printer is one of the one or more predetermined three-dimensional printers, or whether the three-dimensional printer has appropriate credentials. This technique may be particularly useful, for example, where the print job includes purchased content or the like for which the content creator (or distributor) wishes to retain control of fabrication, e.g., by limiting who, where, when, or how many times the print job can be fabricated.

The evaluation may also or instead be based on a variety of sensor measurements and/or other data or information about the processing status of the three-dimensional printer. By way of example and not of limitation, evaluating the availability of the three-dimensional printer may include determining a percentage completion of a current print job at the three-dimensional printer. Evaluating the availability of the three-dimensional printer may include estimating a wait time until the three-dimensional printer will be available and transmitting the wait time to the requester. Evaluating the availability of the three-dimensional printer may include determining whether the three-dimensional printer is immediately available.

It will also be appreciated that a wide variety of sensors may usefully be employed in this evaluation. By way of non-limiting example, the plurality of sensors may include a video camera directed toward a working volume of the three-dimensional printer. The plurality of sensors may include an optical sensor that detects obstructions within a working volume of the three-dimensional printer. The plurality of sensors may include a sensor that detects a quantity of build material available. The plurality of sensors may include a sensor that detects a presence of build material in a material supply feed.

As shown in step 406, when the three-dimensional printer is not available for a print job, the method 400 may include electronically notifying the requester that the print job has been rejected. This may, for example, include a notification such as a textual message or graphic displayed within a user interface used by the requester to submit the print job, or this may include a notification using any suitable communication medium such as an SMS text message or electronic mail communication to the requester.

When the three-dimensional printer is not available for the print job, additional processing may be performed prior to notifying the requester, such as a search for additional, suitable printing resources and/or redirection of the print job. Thus in one aspect, the method may include identifying one or more alternative three-dimensional printers coupled to the data network as resources available for the print job when the three-dimensional printer is not available. In another aspect, when the three-dimensional printer is not available, the method may include identifying an alternative three-dimensional printer coupled to the data network and redirecting the requester to the alternative three-dimensional printer. The redirecting may include automatically redirecting the print job without user intervention, or the redirecting may include transmitting a suggestion to the requester to use the alternative three-dimensional printer. More generally, any suitable information about other available resources and/or redirection of the request may be transmitted to the requester when the three-dimensional printer that received the print job is determined to be unavailable. This may also include information about an expected wait time until the printer will be available, when such information is provided by the printer or can be reasonably inferred from other information.

As shown in step 407, a manual verification may be optionally requested, even where the three-dimensional printer is otherwise determined to be available, before adding the print job to the print queue. The request for manual verification by the requester may be provided, for example, along with contextual information such as an expected time before the print job can begin fabrication, or a current image of the three-dimensional printer (e.g., of the working volume or supply of build material). Thus in one aspect, evaluating the availability of the three-dimensional printer may include transmitting an image of the three-dimensional printer to the requester, and receiving a manual confirmation to proceed with the print job from the requester.

As shown in step 408, when the three-dimensional printer is available, the method 400 may include adding the print job to a queue for the three-dimensional printer and initiating fabrication of an object according to the queue. It will be understood that the three-dimensional printer may only have storage for a current print job, in which case the print queue, or more specifically, the local print queue, may consist of a currently active print job containing zero or one print jobs at all times. In another aspect, the three-dimensional printer may have adequate storage and processing capabilities to locally manage a substantial queue of print jobs, or alternatively, may be coupled to a local resource such as a co-located desktop or laptop computer or networked-attached storage that can operate as a local print queue resource for the three-dimensional printer. When the print job is accepted, a notification may be sent to the requester using, e.g., any of the notification techniques described above.

It will be appreciated that certain print jobs may include multiple, separate physical objects. These objects may be generally unrelated, e.g., where a requester simply decides to build multiple objects at one time, or these objects may be related. Related objects may include structurally related objects, such as where an object larger than a build volume is constructed from several smaller pieces, where the object has several independent moving parts. Related objects may also or instead be contextually related, as with a collection of game pieces such as pieces for a chess board. When a request includes multiple objects, adding these objects to the print queue may include additional processing to allocate the objects among a number of suitable fabrication resources. Thus in one aspect where the print job includes a plurality of objects, the method may include identifying a plurality of printers in proximity to the three-dimensional printer and allocating the plurality of objects for concurrent fabrication among the plurality of printers. This allocation may be managed by the three-dimensional printer that received the request (e.g., by having the printer act as a requester for several other proximate resources), or this allocation may be managed by a remote print server that identifies and coordinates operation of a number of physically proximate or otherwise suitable resources.

As shown in step 410, the method 400 may include providing information about a queue for the three-dimensional printer to the requester. This may include transmitting a print queue status to the requester for display in a user interface or within the body of an electronic mail message or text message, or more generally using any suitable communication medium. Although depicted in FIG. 4 as occurring after a print job is added to the print queue, it will be understood that the print queue status may be usefully shared with the requester at any time before or during processing of the print job, and/or periodically while the print job is pending or executing.

As shown in step 412, the method 400 may include completing fabrication, after which the requester may be notified and the object retrieved using any suitable online and/or offline techniques.

Print queue status information as contemplated above may also include information relating to operation of the three-dimensional printer. For example, the method may include transmitting status information from one or more of the plurality of sensors to the requester during an execution of the print job. The method may include notifying the requester of a successful completion of the print job, or the method may include notifying the requester if the print job fails to complete. In this communication of status information, the three-dimensional printer may also request further user input, such as by inquiring whether to try printing the object again, or whether to forward an unsuccessful print job to another resource. In one aspect, the status information may include at least one photograph captured, e.g., from a video camera or digital still camera associated with the printer, which may be transmitted directly to the requester, or to some other location such as a social networking platform. In one aspect, the social networking platform may include one or more of Flickr, Twitter, LinkedIn, Google+, and Facebook, or any other website or the like where the requester can share the at least one photograph with others using tools available within the social networking platform.

It will be readily appreciated that the above steps are provided by way of example and not limitation, and that numerous variations are possible including additions, omissions, and or variations of the steps recited above. All such variations as would be appreciated by one of ordinary skill in the art are intended to fall within the scope of this disclosure. In particular, the various step described above may be performed by a networked printer that directly hosts a connection with a remote user, or by a print server or the like that mediates print job administration between users and fabrication resources. Thus the various steps may be performed in a distributed manner among two or more of a user, by a print server, and/or by a three-dimensional printer depending upon the specific network of devices performing the method. By way of example, a three-dimensional model may be transmitted directly from a three-dimensional scanner to a three-dimensional printer for fabrication. The scanner and the printer may be locally coupled to one another, or remotely coupled through a print server or the like, or connected through a network using a peer-to-peer or similar relationship.

It will also be understood that this disclosure includes apparatus for performing the methods described above. Thus in one aspect there is disclosed a three-dimensional printer including a network interface configured to receive a print job from a requester over a data network, a plurality of sensors that provide status information for a plurality of aspects of the three-dimensional printer; and a processor configured to evaluate an availability of the three-dimensional printer for the print job based upon a signal from at least one of the plurality of sensors. The processor may include any suitable processing circuitry such as any controller, microcontroller, microprocessor and/or other circuitry used to control the three-dimensional printer, and/or any similar processing circuitry in a co-located computer or the like. Where processing is distributed, e.g., among multiple printers, a print server, a requester device, and so forth, the various steps may be distributed in any suitable fashion consistent with networked printing as contemplated herein.

In another aspect, the method steps may be embodied in computer executable code stored in a non-transitory computer readable medium such as a computer memory. Thus there is disclosed herein a computer program product embodied in a non-transitory computer readable medium that, when executing on one or more computing devices, performs any of the steps described above. In one aspect, this may include the steps of: receiving a print job from a requester over a data network at a three-dimensional printer, the three-dimensional printer including a plurality of sensors that provide status information for a plurality of aspects of the three-dimensional printer; and evaluating an availability of the three-dimensional printer for the print job based upon a signal from at least one of the plurality of sensors.

Figure 5:
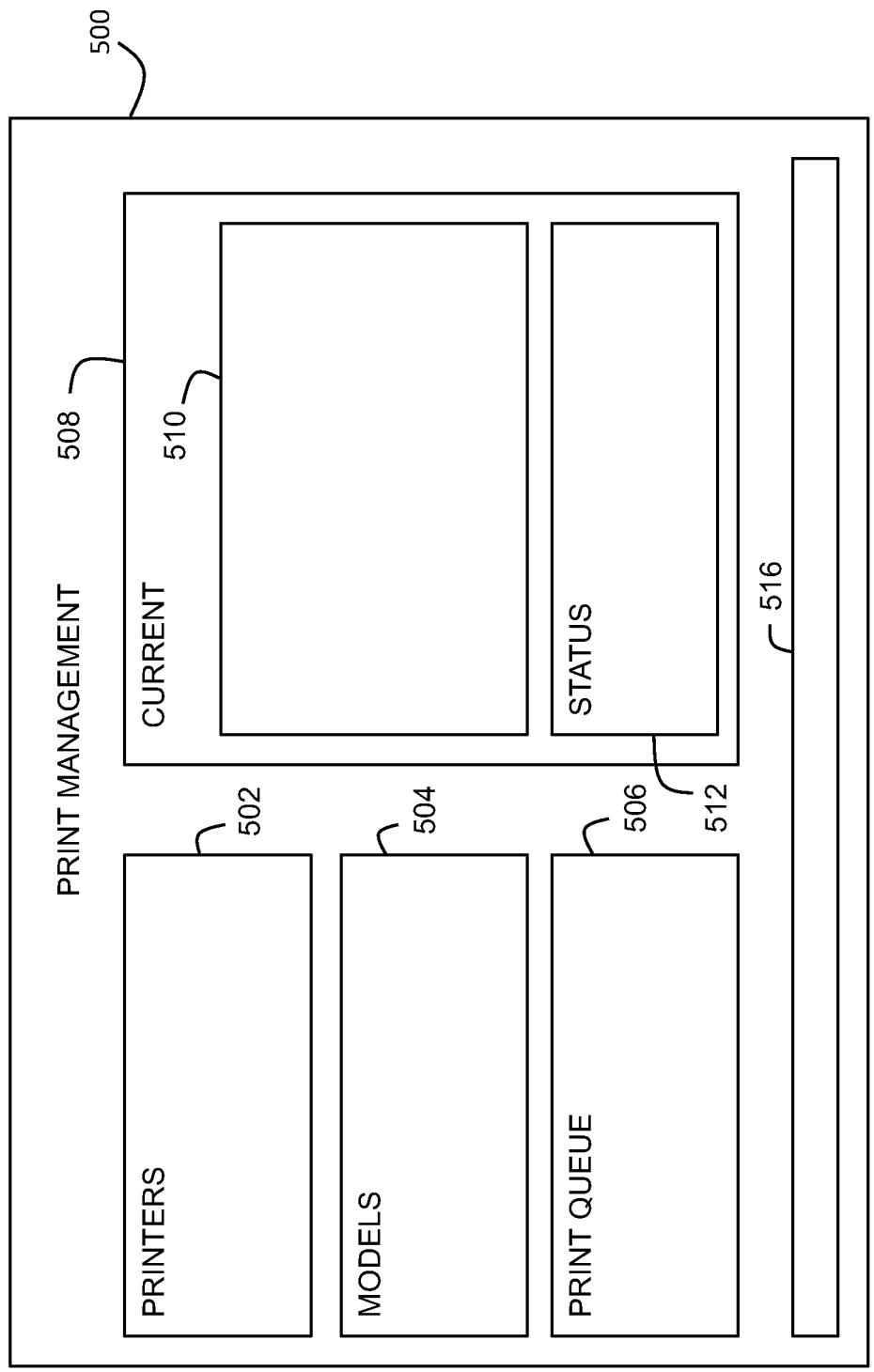
FIG. 5 depicts a user interface for management of networked printing.

FIG. 5 depicts a user interface for networked three-dimensional printing. The user interface 500 may be a web page or other remotely created and executed interface supported, e.g., by one of the print servers or web servers described above. In another embodiment, the user interface 500 may be served by one of the three-dimensional printers described above, which may execute a web server for remote access to administrative or fabrication functions of the three-dimensional printer. In another embodiment, the user interface 500 may be created by a local application that retrieves data, images, print queue information, models, and so forth from a variety of remote applications and other resources, while also formatting outbound commands from the client device to the various resources so that the remote resources can be integrated within a single workspace on a client device. The user interface 500 may in general be rendered on a display or similar hardware on a client device or mobile device, and may permit user interaction through any suitable controls to permit local control and administration of remote fabrication resources. In general, the user interface 500 may be an interface for management of a variety of remote fabrication resources as generally described above.

For example, the user interface 500 may include a first display area 502 that shows a list of available online three-dimensional printers or other fabrication resources. This display area may be interactive, and may permit, e.g., sorting of fabrication resources, searching for new fabrication resources, and the like. The first display area 502 may also or instead provide status information for each listed fabrication resource, such as information about availability, recent print activity, a current queue of objects for printing at that resource, and so forth. In one aspect where the user interface 500 is a web page for remote users to manage fabrication, the first display area 502 may be adapted to receive a manual selection of one of the plurality of three-dimensional printers from the remote user to execute a print job.

The user interface 500 may also or instead include a second display area 504 that shows a list of available models for fabrication by the fabrication resources. This may include any of a variety of interactive features such as search capabilities for models, and links to information about models such as cost, user reviews, complexity and print time, model renderings, descriptions, notes from a content provider, and so forth. This may also include an interface tool to permit a user to fabricate a model. The second display area 504 may be adapted to receive a batch print job from a remote user, the batch print job including a plurality of related print jobs. For example, a user may select an object displayed in the second display area 504 that includes multiple parts, or the user may select multiple items listed in the second display area 504 (using, e.g., a conventional control key and mouse click, or any other suitable user interface controls/techniques) for batch processing. This may also permit the remote user to provide additional, related information, such as a permissible allocation of the plurality of related print jobs among the plurality of three-dimensional printers, which permissible allocation may include general preferences (e.g., high-speed printers or local printers), specific preferences (e.g., use printer xyz), or firm requirements (e.g., use only printer xyz, or only printers selected from a specific group).

The user interface 500 may also or instead include a third display area 506 that shows a print queue. This may include a local print queue for a specific fabrication resource, or this may include a print queue stored at a print server for a user, along with information about where and when each object is scheduled for fabrication. The user interface 500 may permit one-click drag-and-drop print queue management of three-dimensional printing jobs. For example, a user may simply drag an object from the second display area 504 (objects) into the third display area 506 (print queue) where the object may be automatically or manually prioritized for execution. Alternatively, the user may drag an object from the second display area 504 into the first display area 502 (printers) to request (with a single operation) fabrication of the object by a specific printer. More generally, the user interface 500 may facilitate control over fabrication of models from a variety of content sources using a variety of fabrication resources, some or all of which may be remote from a current user manipulating the user interface 500.

The user interface 500 may include a fourth display area 508 that displays information for a currently active print job. This area may usefully include any information related to the print job such as status, time to completion, source, current time, etc. Additionally, this area may include a control or group of controls for manual operation of the three-dimensional printer by a remote user. Thus for example a user may remotely stop fabrication, restart fabrication, cancel fabrication, change fabrication settings, perform a test extrusion, and so forth, as though the user were locally controlling the printer.

The fourth display area 506 may include a visualization area 510 that displays a visual representation of the print job. For example, the visualization area 510 may display a current tool path of the printer that is executing the print job, such as a two-dimensional layer of the object showing a path of a print head as it traverses that layer. The visualization area 510 may also or instead show a simulated print object, such as a rendering of a three-dimensional model depicting a current state of the completion of an object being fabricated according to a print job. The visualization area 510 may also or instead show an image of a working volume of a three-dimensional printer or other fabrication resource captured during execution of the print job. This may, for example, include a digital still image (which may be updated periodically) or a video image captured from a video camera at the three-dimensional printer. Thus a user may visually monitor progress or status of a remote print job through the user interface 500. A status area 512 may also be provided that shows current status information (e.g., percentage completion, time until start, time until completion, and so forth) for the active resource.

The user interface 500 may also include a menu bar 516 or the like for other functions not otherwise accounted for within the other active areas. This may include file information, search tools, help menus, user or account information, and so forth. This may include controls to share information about print activity. For example, the user interface may include at least one control to capture a frame of data from the video camera as a video image and to transmit the video image to a remote location through the data network. The remote location may, for example, be a social networking site such as any of the social network platforms described above. In another aspect, the device may be configured to transmit the video image in an electronic mail communication to, e.g., the user or one or more recipients identified by the user. In another aspect, the user interface may include a control to capture a stop-motion animation of a fabrication of an object using the video camera. This may include user controls for a frame rate, duration, or other parameters of the stop-motion animation so that an animation of desired length and detail can be created for sharing or other use.

FIG. 6 is a flowchart of a method for operating a three-dimensional printer on a network. In particular, the method 600 of FIG. 6 emphasizes autonomous operation of the three-dimensional printer using content available through the data network.

The method 600 may begin with coupling a three-dimensional printer to a data network, as shown in step 602.

As shown in step 604, the method 600 may include locating one or more sources of content for fabrication by the three-dimensional printer on the data network according to one or more user-provided criteria. The sources of content may, for example, include any of the content sources described above, which may provide content on a syndicated basis using any suitable protocol (such as RSS or the like) so that the three-dimensional printer can identify new content from the content sources as the new content becomes available.

As shown in step 606, the method 600 may include subscribing to new content from the one or more sources of content.

As shown in step 608, the method may include receiving at least one three-dimensional model of new content from one of the one or more sources of content. This may occur in a variety of ways. For example, where the three-dimensional printer has subscribed to an RSS feed provided by the content source, a new item in the RSS feed (or media enclosure or similar content embedded in the feed) may provide a URL or the like that identifies a network location for a three-dimensional model, along with any metadata that the three-dimensional printer might use (or present to a user for evaluation) to determine whether to retrieve the three-dimensional model. It will be understood that while RSS ("RDF Site Summary," a.k.a., "Really Simple Syndication") provides one useful platform for syndicating content including three-dimensional models, any suitable technology or combination of technologies may also or instead be employed, including 'push' technologies that forward notifications to clients and/or 'pull' technologies that explicitly request updates on any suitable regular or ad hoc basis.

It will be understood that fabrication of a single model using certain techniques may take a substantial amount of time, regardless of the rate at which individual models or groups of models are published from different sources. As such, a method as contemplated herein may advantageously apply local prioritization to ensure that more desirable content is not crowded out of limited fabrication resources by less desirable content. Receiving content as shown in step 608 may also include receiving a plurality of three-dimensional models and prioritizing fabrication of the plurality of three-dimensional models into an order of fabrication.

As shown in step 610, the method may include fabricating an object from the at least one three-dimensional model. As noted above, this may include fabricating a plurality of three-dimensional models in an order determined by a local prioritization scheme. Additional features may be usefully provided. For example, the model may be locally analyzed by a printer and automatically scaled according to the printer's build volume, or the model may alternatively be divided into multiple, separate objects, each fitting within the build volume, and all capable of being assembled into the original object. This approach may be particularly advantageous where a printer is autonomously receiving and fabricating multiple objects in succession without user supervision.

Thus, in one aspect there is disclosed a three-dimensional printer configured for autonomous operation to retrieve and fabricate content published to a network. While the method 600 described above is generally local in nature, it will be appreciated that other collocated resources may be used, such as a desktop computer or the like coupled to a three-dimensional printer, which desktop computer may subscribe to content, prioritize new content, and then direct the content to the local three-dimensional printer. In another aspect, the various steps may be performed by a print server or the like which couples remote content sources to remote three-dimensional printers according to any user criteria. More generally, a variety of additions, omissions, rearrangements and modifications to the steps described above may be employed without departing from the scope of this disclosure.

FIG. 7 is a flowchart of a method for operating a three-dimensional printer with a video camera and a network interface. In particular, the method 700 of FIG. 7 emphasizes incorporation of data from the video camera into operation and management of the three-dimensional printer.

As shown in step 702, the method 700 may begin with providing a three-dimensional printer including a build volume, a network interface coupled to a data network, and a video camera positioned to capture video of the build volume from a point of view, such as from above or in front a side of the build volume. This may, for example, include any of the three-dimensional printers described above.

As shown in step 704, the method 700 may include receiving a three-dimensional model through the network interface using, e.g., any of the techniques for locating and retrieving models as described above. By way of example, this may include direct access to a content source, syndicated access to a feed of content, and/or use of a print server or other remote print management tool.

As shown in step 706, the method 700 may include fabricating the three-dimensional model as an object within the build volume of the three-dimensional printer, all as generally contemplated above.

As shown in step 708, the method 700 may include providing a user interface to a remote user accessing the device through the network interface, wherein the user interface presents an image of the build volume from the camera and a two-dimensional projection of the three-dimensional model from the point of view of the video camera. This may be any of the user interfaces described above, or any other suitable interface for conveying visual information such as a video image and/or model projection. It will be understood that a variety of user interface technologies and techniques are well known in the art, any of which may be suitably adapted to providing the user interface as contemplated herein. The two-dimensional projection may be any suitable rendering, simulation, or other visualization of the model and its current state of completion. Thus for example the two-dimensional projection may be obtained from a three-dimensional scanner or other data acquisition device coupled to a processor of the three-dimensional printer. The two-dimensional projection may be an image of the object as simulated based upon operation of the three-dimensional printer, using, e.g., a tool path history or a current state of completion. The two-dimensional projection may be dynamically updated to correspond to a state of physical completion of the object in order to provide real time, or quasi-real time visual status information. In one aspect, the two-dimensional projection may simply be a video image from the video camera.

As shown in step 710, the method 700 may include transmitting status information over the data network upon completion of the object. This may, for example, include data presented through the user interface, or any other status information or summary thereof. For example, the status information may include a digital image from the video camera, which may be transmitted with an electronic mail communication confirming completion of the object. More generally, status information may include any of the status information described above, and may be transmitted to a user through an electronic mail communication, instant messaging text message, or any other suitable communication medium.

It will be readily appreciated that a device such as a three-dimensional printer may be configured to perform the steps described above. Thus in one aspect there is disclosed herein a device including: a three-dimensional printer having a build volume; a network interface coupled to a data network; a video camera positioned to capture video of the build volume from a point of view; and a processor configured to receive a three-dimensional model through the network interface, and to control operation of the three-dimensional printer to fabricate the three-dimensional model as an object within the build volume of the three-dimensional printer, the processor further configured to provide a user interface to a remote user accessing the device through the network interface, and to present in the user interface an image of the build volume from the camera and a two-dimensional projection of the three-dimensional model from the point of view of the video camera.

The processor may be configured to monitor operation of the three-dimensional printer based upon a comparison of the two-dimensional projection with the image of the build volume. Using this type of image analysis, it may be possible to track actual progress against predicted progress to identify equipment malfunctions or other interference that might cause the physical object to deviate from the model used to fabricate the physical object. For example, a temperature change in an extruder, an air bubble in a path of melted supply material, or a tool misstep might cause an unrecoverable error in a fabrication process. By comparing actual to expected two-dimensional or three-dimensional results, a fabrication process can be expeditiously aborted and restarted or otherwise addressed without waiting for completion and physical inspection of the constructed object. In addition, more subtle fabrication errors such as misalignment of layers, surface holes, inaccurate material build-ups or deposits, rotational distortion, and so forth may also be detected and address prior to completion of a build. More generally, a variety of machine vision functions may be implemented locally, or with cooperation between a local printer and a remote print server, using a video camera or digital still camera as a source of visual input.

As generally described above, the three-dimensional printer may be configured with a variety of tools and functions to facilitate networked use. For example, the processor may be configured to provide credential-based access to a user interface of the three-dimensional printer. As another example, the user interface may provide status information for the three-dimensional printer. This may include status information for a build process executing on the three-dimensional printer currently, or an anticipated build. The user interface may usefully display a two-dimensional tool path for the three-dimensional printer, the two-dimensional tool path corresponding to a current layer of the object during a fabrication of the object by the three-dimensional printer, or any other useful two-dimensional information. In one aspect, the processor may be configured to couple the three-dimensional printer in a communicating relationship with a remote print server through the data network, such as to facilitate networked use or management of the three-dimensional printer through the remote print server.

The three-dimensional printer may also be configured for a variety of diagnostic and technical support functions. For example, the user interface may support remote access for technical support during local operation of the three-dimensional printer. Thus for example, technical support personnel may connect to the three-dimensional printer and employ the user interface to configure, troubleshoot, reprogram or update the three-dimensional printer from a remote location. The process may be programmed for supporting functions. For example, the processor may be configured to fabricate a test object, capture an image of the test object, and compare the image to the test object to validate operation of the three-dimensional printer.

Devices, systems, methods, and techniques for creating a raft (e.g., an easily removable raft) will now be discussed.

In general, rafts may be used in a three-dimensional printing process for automatic leveling, to prevent warping of an object being printed, or the like. A typical raft may be printed as a regular grid of crisscrossing, spaced apart roads of material (e.g., build material). This may allow the raft to be easily removable from a build platform of a three-dimensional printer and from an object being fabricated. However, these rafts may still create a substantial adhesion surface that bonds to an object being fabricated in certain locations, and complete removal of the raft from the object may be challenging. In the prior art, sparse rafts have been attempted, but typically allow for the printed object to slightly droop between the raft filaments resulting in an unsatisfactory bottom surface. Interstitial drooping of the bottom layer of the object (between raft lines) may result in a bond between the first layer of the object and the last layer of the raft that is stronger than the bond between the first layer of the object and the second layer of the object.

FIGS. 8A and 8B illustrate fabrication of a raft for a three-dimensional printing process. Specifically, FIG. 8A depicts the creation of a first layer 810 in a three-dimensional printing system 800, and FIG. 8B depicts the creation of a second layer 812 in a three-dimensional printing system 802, where the first and second layers 810, 812 are layers of an object being fabricated on a three-dimensional printer. FIGS. 8A and 8B shown extruder 804, a raft 806, a build platform 808, a first layer 810, and a second layer 812. In general, the raft 806 may be a removable raft fabricated such that the raft 806 can be easily and preferentially delaminated from an object after fabrication. In general, the printing process may include a processing height specified for the process, which identifies a vertical step size from layer to layer during fabrication.

FIG. 8A depicts the extruder 804 fabricating the first layer 810 of the object on the raft 806 in an extrusion path 814 with the extruder 804 (i.e., a nozzle of the extruder) at a height H1 above a top of the raft that is greater than the processing height (e.g., the height used to create the raft). The height, H1, as measured from the raft 806, may thus be equal to a processing height, h, plus another height, $\Delta$ (i.e., H1=h+$\Delta$). A skilled artisan will recognize that the extruder 804 may be raised to any suitable height greater than the processing height above the preceding layer that will retain but weaken the bond between the first layer 810 and the raft 806.

FIG. 8B depicts the extruder 804 fabricating the second layer 812 of the object with a second extrusion path 816. As shown in FIG. 8B, the extruder 804 may be disposed at a processing height, h, above a top of the first layer 810, such that the extruder 804 is closer to the first layer 810 when creating the second layer 812 than the extruder 804 was to the raft 806 when creating the first layer 810. The creation of the second layer 812 may thus occur when the extruder 804 (i.e., a nozzle of the extruder) is disposed at a height H2. Corresponding machine ready code may be generated by a slicing engine or the like (e.g., as described herein) to fabricate an object weakly bound to a raft 806.

In summary, in FIGS. 8A and 8B, the raft 806 may be printed at a processing height, h, above the build platform 808; the first layer 810 may be printed at 2h+Δ above the build platform 808; and the second layer 812 may be printed at a height somewhere between 3h and 3h+Δ above the build platform 808. In this example, these values are referenced to the build platform 808, but they may instead be referenced to another common z position. For example, the top of the raft 806 may be at a processing height of h−Δ and the first layer 810 may be at a processing height of 2h, thus placing the first layer 810 a distance Δ above the normal distance (the processing height, h) from the raft 806 and providing a weaker bond. Thus, any of a variety of vertical steps may be used around the more generally specified processing height, provided that an additional offset, Δ, is used when fabricating the first layer of an object on a raft.

The vertical distances described herein refer generally to steps in processing height. This may imply, but does not necessarily require, a specific resulting height in a layer. Thus, for example, when a layer is "fabricated" at a particular height, it may mean that the extruder 804 or other mechanism is positioned within a build volume of a three-dimensional printer to fabricate at that height, or at some corresponding vertical position that results in a layer fabricated at that height. Similarly, fabrication at a particular height may specifically mean that the fabrication results in layers of the specified height, or some consistent processing offset to such specified height. The actual height achieved in any particular layer may depend on the vertical position of any underlying surfaces, the volumetric flow rate of deposited material, the speed of extrusion, the type of build material being used or temperature thereof, or any of a variety of other factors. More generally, while processes are described in terms of a processing height, the resulting height may thus in certain circumstances be higher or lower than a vertical height of the extruder 804. Accordingly, terms such as height, processing height or the like are not intended to refer to a specific absolute height, but rather to a consistent relative value from layer to layer within a printing process. Thus for example, a height may refer to the actual height of an extruder nozzle at which an extruder deposits material, or to the actual height of a resulting layer, or any other suitable frame of reference for consistently determining a height as that term is used herein.

The extruder 804 may include any of the extruders described herein or that may be otherwise utilized in a three-dimensional printing process. The extruder 804 may also or instead include any mechanism for depositing a material in a three-dimensional printing process.

The raft 806 may be used, e.g., to automatically level a build platform, or to reduce or prevent warping of an object and separation from a build platform during a print. The raft 806 may be any as described herein. The raft 806 may include a rectilinear pattern as described below, or any other suitable pattern to provide a base for fabricating an object.

The build platform 808 may be any as described herein. In general, the raft 806, which may include one or more layers, may be fabricated on the build platform 808. The raft 806 may include multiple layers such as a base layer deposited on the build platform 808, one or more intermediate layers, and a raft layer to support an object. The first layer 810 described above may include the first layer of the object fabricated on the raft 806. The second layer 812 may include any layer printed above or on top of the first layer 810. It will be appreciated that ordinal terms such as 'first' and 'second' used herein are contextual labels of convenience, and do not imply any strict order or function of particular layers. Thus, other layers may precede or come between a first layer and a second layer, and a first layer or second layer may generally refer to any layer of a raft or an object, all without departing from the scope of this disclosure. As such, references throughout this document to layers such as a "first layer" do not refer to a specific layer in a fabrication process unless expressly stated or otherwise clear from the context.

While the foregoing description specifically contemplates removable rafts for interfacing objects to build platforms or the like, it will be appreciated that the principles of this disclosure may be readily adapted to other applications such as support structures or the like used in three-dimensional fabrication to provide elevated support in various regions of an object. Thus it will be understood that the term raft as used herein also includes supports or support structures, and this disclosure specifically contemplates adaptations of the techniques herein to use with support structures for three-dimensional printing.

Figure 9:
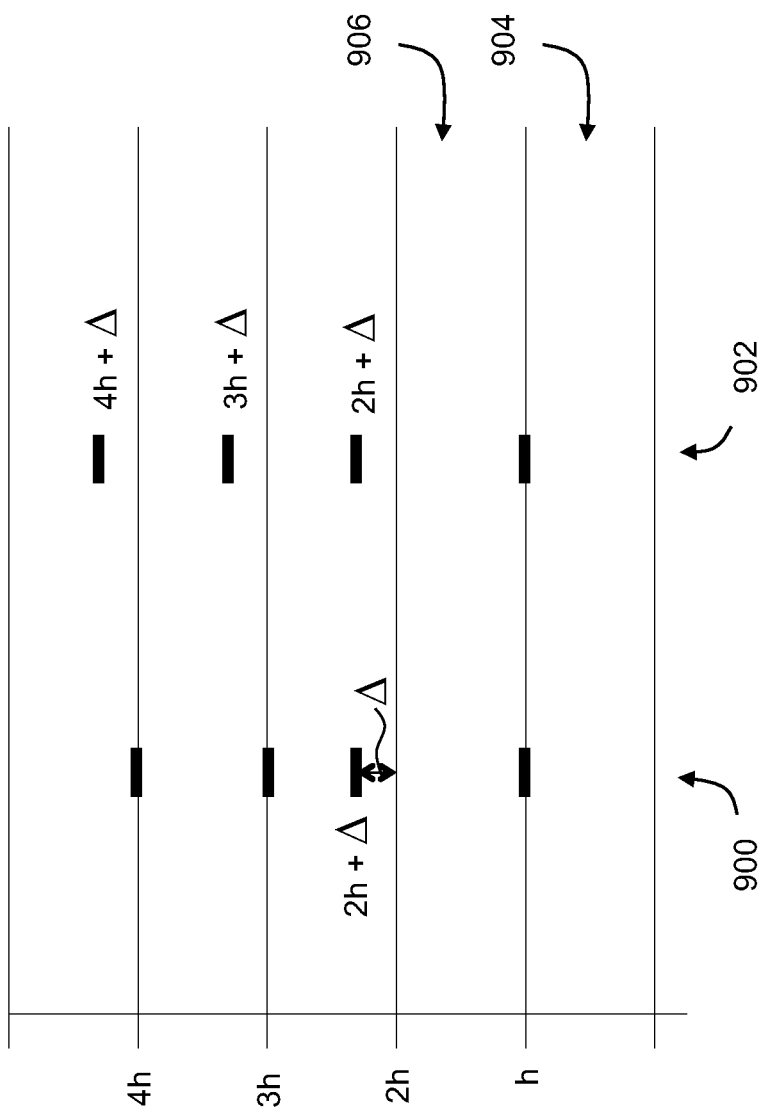
FIG. 9 shows possible processing heights for layers of a three-dimensional build.

FIG. 9 shows examples of processing heights for layers of a three-dimensional build. In general, a technique may include depositing a first layer of a printed object above a raft at a height greater than a standard vertical processing step in order to form a weak bond to an underlying layer. Then, a second layer may be deposited at a typical height so that it bonds more securely to the first layer than the bond of the first layer to the underlying layer. There is a wide range of possible processing heights for the next layer, and FIG. 9 shows a few possibilities represented by a first group of layer heights 900 and a second group of layer heights 902. Where the top of one layer 904 (such as the top layer of a raft) is at a height h, a second layer 906 (such as the first layer of an object fabricated on the raft) may be at a height greater than a normal processing height, h, for the process by an offset, Δ, in order to provide a weaker bond to the first layer 904. A subsequent layer may return to the normal processing height either in a manner that returns the overall process to the regular step size, h (as shown in the first group 900) or in a manner that immediately returns the next layer to the regular step size, h (as shown in the second group 902) by subtracting the offset, Δ, from the next vertical step.

In the latter configuration, vertical steps occur at h, a second layer at 2h+Δ, 3h+Δ, and so forth (group 902). In the former configuration, vertical steps occur at h, 2h+Δ, 3h, 4h, and so forth (group 900). Either approach or combinations of or other variations to these step sizes may also or instead be used provided that the first layer fabricated on the raft is weakly bonded to the raft using a greater than normal vertical step size. In one aspect, it is possible that Δ is relatively large, e.g., such that the second layer, which is extruded at 2h+Δ, places the extruder at or above 3h for extruding the first layer of an object fabricated on the raft. Thus, in one aspect, the extruder height for creating the second layer (such as the first layer of an object fabricated on the raft) may be at or above the extruder height for creating the next layer (such as the second layer of an object fabricated on the first layer).

It will be appreciated that a number of equivalents to this general technique exist. For example, the top layer of a raft may be fabricated at any height not greater than the processing height, h, from a top of a preceding layer, such as a height of h−Δ, and the first layer of the object may be fabricated at 2h. This technique identically places an increased distance of Δ between the layers in order to weaken the interstitial bond. It should also be appreciated that all such heights and dimensions provided herein are approximate, and one skilled in the art will readily appreciate and expect a certain amount of variability in all such physical values. Any such variations consistent with proper operation of the methods and systems described herein, or within the range of measurement or control limits of a particular hardware configuration, whether characterized as "about" or "substantially" or the like, are intended to fall within the scope of this disclosure.

Figure 10:
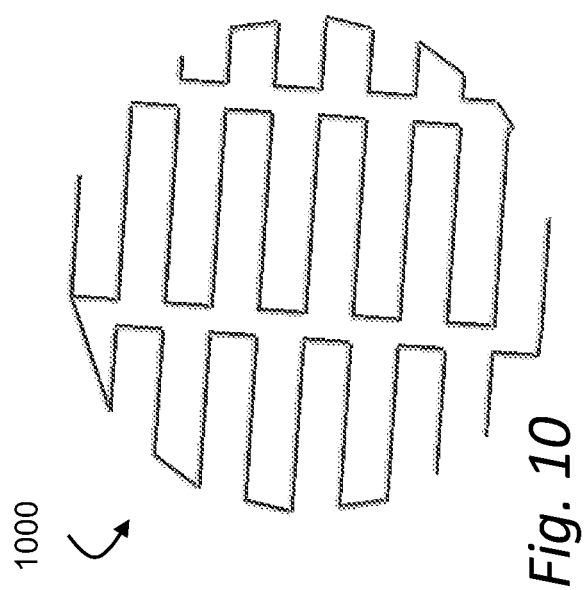
FIG. 10 shows a first layer in a three-dimensional printing process.

FIG. 10 shows a first layer of a raft in a three-dimensional printing process. As shown in FIG. 10, the first layer may include a rectilinear pattern 1000. The rectilinear pattern may form a base layer having a maximum segment length selected to avoid warping of the base layer away from the build platform of a three-dimensional printer. In general, long runs of material with a relatively high coefficient of thermal expansion (e.g., thermoplastics), when adhered to a material with a relatively low coefficient of thermal expansion (e.g., aluminum) will tend to delaminate and warp away due to thermally induced stresses during cooling. In order to mitigate these effects, long runs in the base of a raft may be avoided by using a number of reduced-length segments as shown in FIG. 10.

Figure 11:
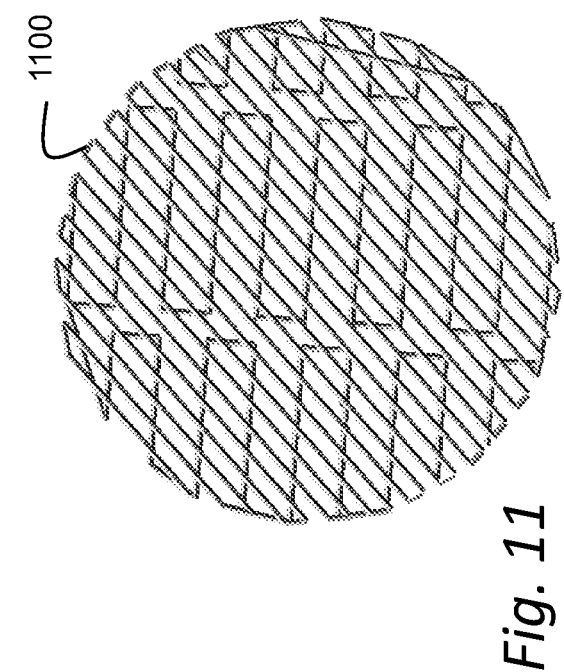
FIG. 11 shows a second layer in a three-dimensional printing process.

FIG. 11 shows a second layer 1100 of a raft in a three-dimensional printing process. The second layer may be deposited on the first layer, and may be deposited at a different orientation than the base layer of FIG. 10, e.g. at a forty-five degree offset, a sixty degree offset, or any other suitable offset. More generally, any number of such layers may be used at progressively changing orientations relative to the base layer.

Figure 12:
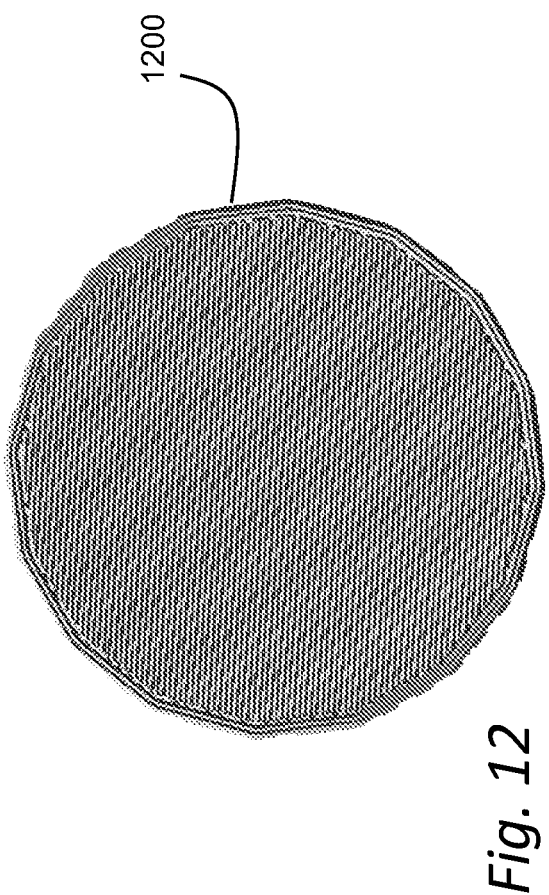
FIG. 12 shows a third layer in a three-dimensional printing process.

FIG. 12 shows a third layer 1200 in a three-dimensional printing process. The third layer may be deposited on the second layer (and/or any number of other intermediate layers). In general, this layer may include closely spaced segments of material in order to present a more continuous supporting surface for layers fabricated thereupon.

Figure 13:
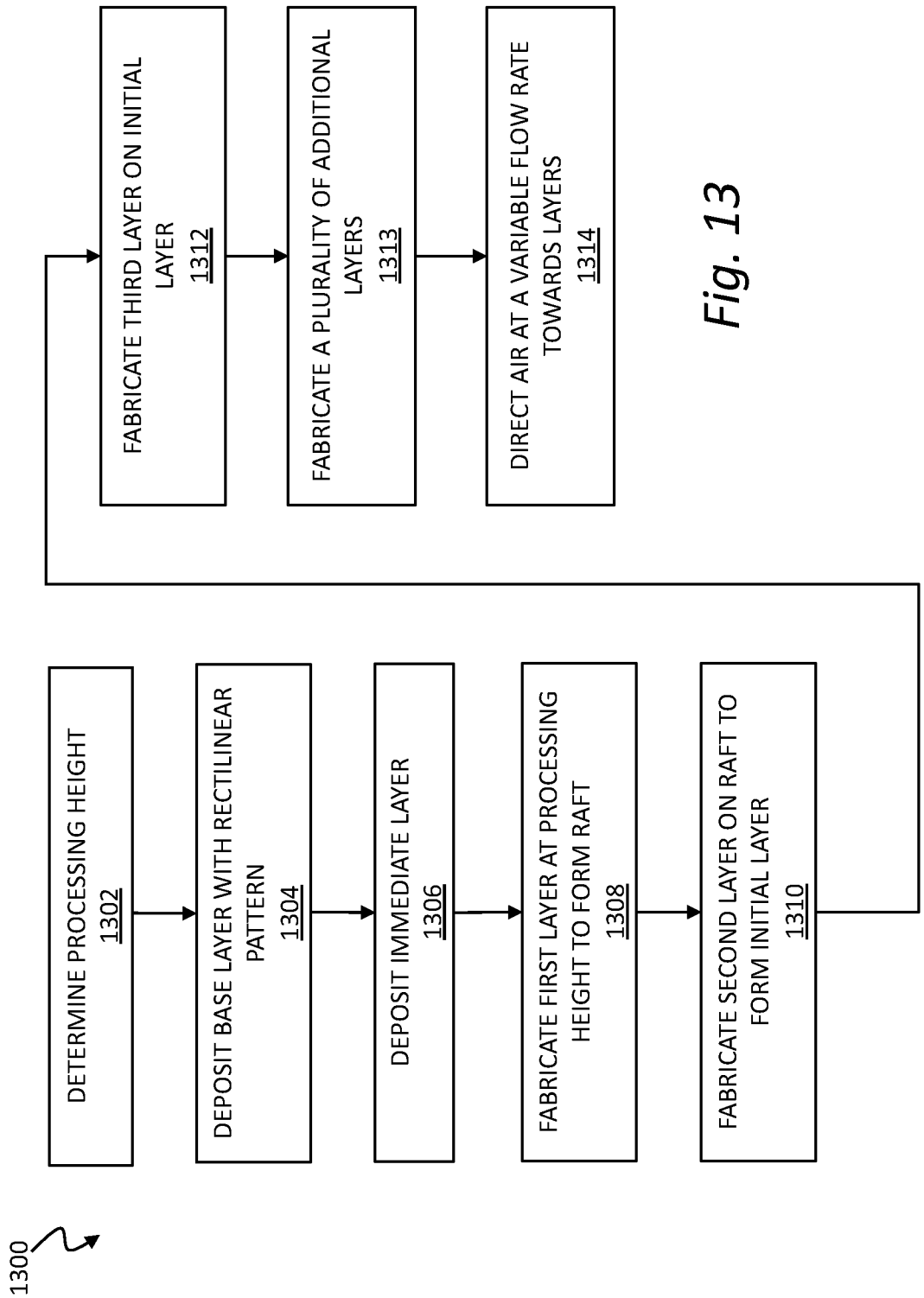
FIG. 13 is a flowchart of a method for operating a three-dimensional printer.

FIG. 13 is a flowchart of a method for operating a three-dimensional printer. The method 1300 may include the use of a computer program product for operating a three-dimensional printer having non-transitory computer executable code embodied in a non-transitory computer-readable medium that, when executing on one or more computing devices, performs the steps of the method 1300. The method 1300 may also or instead include instructions to perform the steps of the method, which may be instructions that configure the computer hardware arrangement to perform the steps of the method 1300.

As shown in step 1302, the method 1300 may include determining a processing height for depositing each of a plurality of layers in the three-dimensional print. The processing height may be a nozzle height for an extruder in the three-dimensional printer, or another height relative to the extruder or a component thereof. Determining the processing height may include receiving this value in a set of printing instructions, prompting a user to provide this value, selecting a default value or a value based on a desired print resolution, or otherwise selecting, calculating, retrieving, or receiving a value of a processing height in any suitable dimensions use in a three-dimensional printing process. The plurality of layers of a raft and/or object may, subject to the variations discussed herein, be fabricated at vertical steps in height substantially equal to the processing height using a build material or the like. In one aspect, the build material is polylactic acid and the processing height is about 0.20 millimeters. In another aspect, the build material is acrylonitrile butadiene styrene and the processing height is about 0.20 millimeters. Other processing heights are possible.

As shown in step 1304, the method 1300 may include depositing a base layer including a rectilinear pattern having a maximum segment length selected to avoid warping of the base layer away from a build platform. This length may be estimated, determined empirically, determined analytically, or otherwise provided or determined, and may be used to limit the length of individual segments within the rectilinear pattern. The base layer may be deposited directly onto a build platform or the like, or on any other suitable supporting structure or material.

As shown in step 1306, the method 1300 may include depositing one or more intermediate layers. Such intermediate layers may be deposited at progressively changing orientations relative to the base layer. The intermediate layer(s) may include the first layer as described below with regard to step 1308.

As shown in step 1308, the method 1300 may include fabricating a first layer of the three-dimensional print at a distance from an underlying layer no greater than the processing height to form a raft for an object. In this context, the term "first" layer is intended to refer to the layer immediately preceding the first object layer, or alternatively stated, the layer that is desired to be weakly bonded to the fabricated object. The underlying layer may be a build platform of the three-dimensional printer, or any intermediate layer or a base layer as described above. For example, the underlying layer may be a base layer for the raft. The first layer may be formed of a plurality of segments having a maximum spacing selected to reduce drooping of the second layer between each of the plurality of segments. It will be understood that the top layer of the raft may actually be offset below the processing height (e.g., h−Δ, as discussed above), with the next layer fabricated at twice the processing height (e.g., 2h in the example above) to add an offset relative to the otherwise consistent step size and achieve a weakened bond to the raft below.

As shown in step 1310, the method 1300 may include fabricating a second layer of the three-dimensional print on the raft to form an initial layer of the object. The second layer may be extruded at a distance from a top of the first layer greater than the processing height, thereby forming a relatively weak bond between the first layer and the second layer. In an implementation where the build material is polylactic acid and the processing height is about 0.20 millimeters, the second layer may be extruded at a distance at least 0.23 millimeters greater than the processing height above the first layer. In an implementation where the build material is acrylonitrile butadiene styrene and the processing height is about 0.20 millimeters, the second layer may be extruded at a distance at least 0.35 millimeters greater than the processing height above the first layer. Other distances are possible for the extrusion of the second layer, and the magnitude of the offset may vary according to, e.g., the extrusion temperature, the material type, or any other parameters.

As shown in step 1312, the method 1300 may include fabricating a third layer of the three-dimensional print on the initial layer of the object. The third layer may be extruded at a distance no greater than the processing height from a top of the second layer, thereby forming a relatively strong bond between the second layer and the third layer. For example, the third layer may be extruded at a distance of about twice the processing height from a top of the first layer.

As shown in step 1313, the method 1300 may include fabricating a plurality of additional layers to create an object. This may include fabricating a number of layers each at a vertical distance above a preceding layer substantially equal to the processing height.

As shown in step 1314, the method 1300 may include directing air at a variable flow rate toward the layers as they are being fabricated. The air may be directed toward the layers using a cooling fan and duct. The variable flow rate may increase or be greater as the first and second layers are being fabricated.

In one aspect, the first layer (or more generally, the raft) may be fabricated with a first material and the second layer (or more generally, the object) may be fabricated with a second material that is different than the first material. The third layer (and/or subsequent layers) may be fabricated with the same material as either the first material or the second material, or a different material.

Implementations may include a system for operating a three-dimensional printer. The system may include a three-dimensional printer having an extruder, and processing circuitry associated with the three-dimensional printer that is configured to perform the steps of the method 1300. The processing circuitry may be included in a processor, controller, microcontroller, or the like associated with the three-dimensional printer as described herein, or in another component, for example, a computer locally coupled to the three-dimensional printer, or any other component shown in FIG. 1 or 3.

Figure 14:
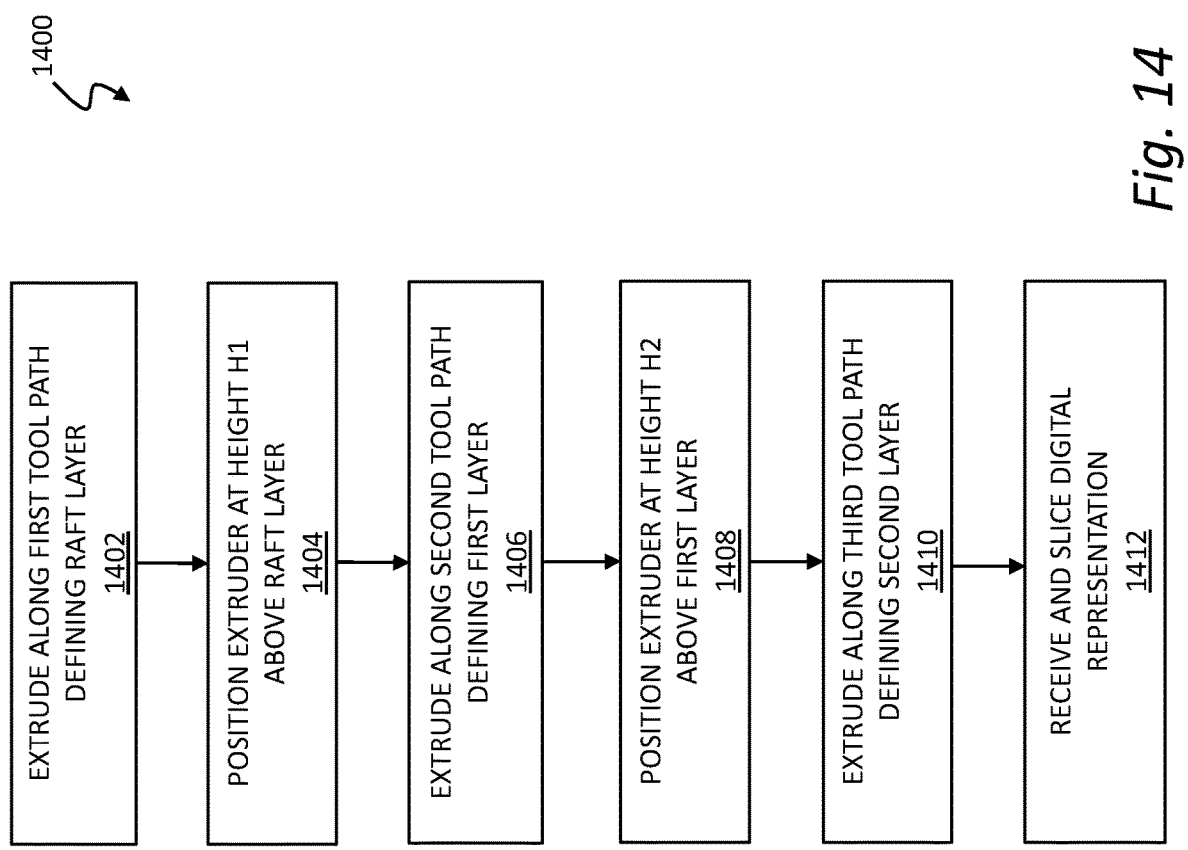
FIG. 14 is a flowchart of a method for operating a three-dimensional printer.

FIG. 14 is a flowchart of a method for operating a three-dimensional printer. The method 1400 may include generating tool instructions for building a three-dimensional model, where the tool instructions include directions to carry out the steps of the method 1400.

As shown in step 1402, the method 1400 may include extruding along a first tool path that defines a raft layer.

As shown in step 1404, the method 1400 may include positioning an extruder of the three-dimensional printer at a height H1 above a top of the raft layer. The height H1 may be greater than a processing height for the three-dimensional model.

As shown in step 1406, the method 1400 may include extruding along a second tool path that defines a first layer of the three-dimensional model, thereby securing the first layer to the top of the raft layer with a first bond strength.

As shown in step 1408, the method 1400 may include positioning the extruder at a height H2 no greater than the processing height above a top of the first layer.

As shown in step 1410, the method 1400 may include extruding along a third tool path that defines a second layer of the three-dimensional model, thereby securing the second layer to the first layer with a second bond strength greater than the first bond strength.

As shown in step 1412, the method 1400 may include receiving a digital representation of the three-dimensional model and slicing the digital representation into a plurality of layers each including a two dimensional representation of a cross section of the three-dimensional model. The slicing may be performed as described herein or as otherwise known in the art.

The techniques for raft creation may also be used for creating easily removable support structures. The extruder path may be generated, e.g., during a process for classifying and generating different regions based on their location within an outline, or generally during a method for generating extrusion paths and building a three-dimensional object based on a digital three-dimensional model as described herein. The methods may take place via a server and/or a client device.

Techniques for slicing will now be discussed in more detail.

Figure 15:
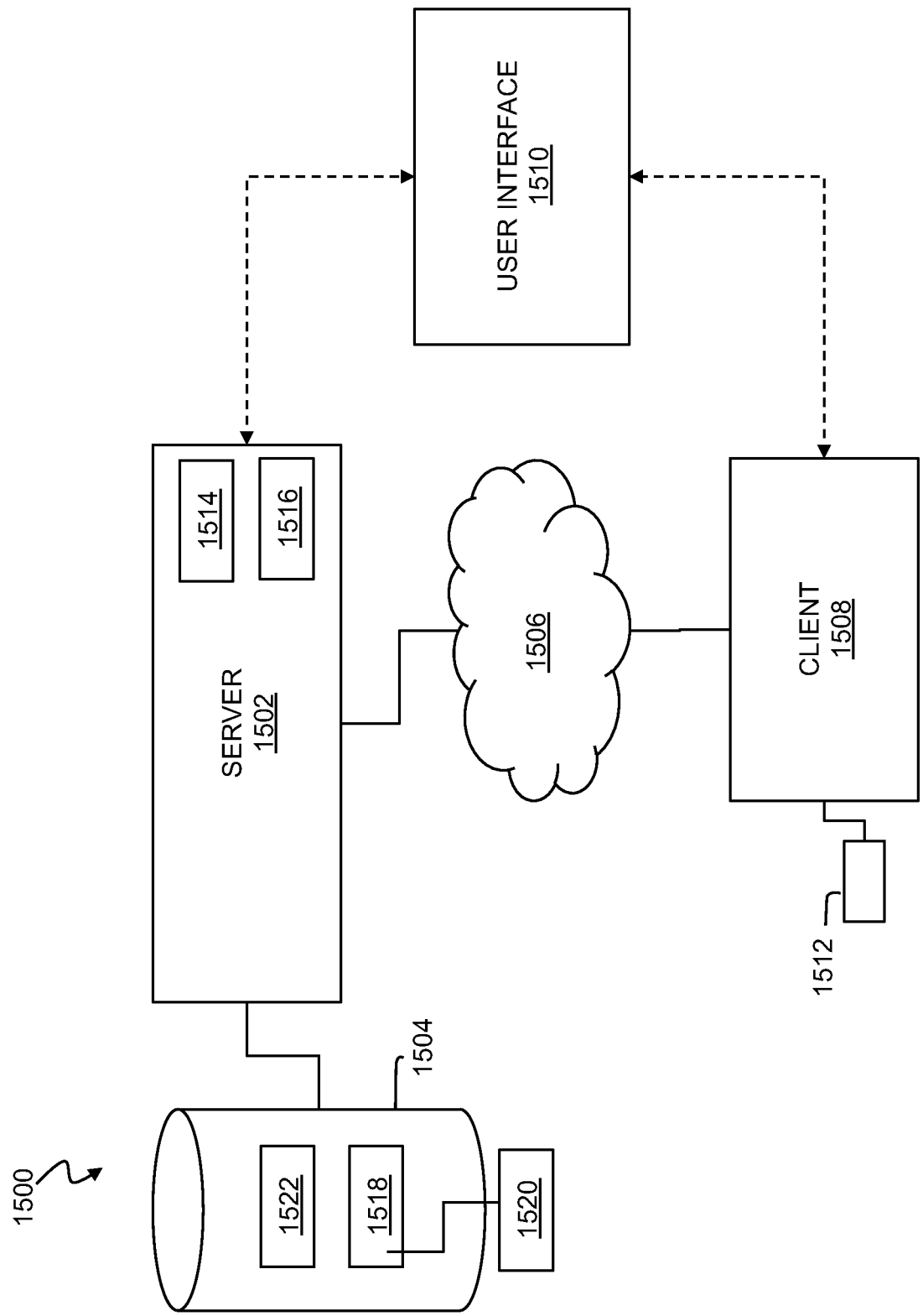
FIG. 15 depicts a networked three-dimensional printing environment.

FIG. 15 depicts a networked three-dimensional printing environment. In general, the environment 1500 may include a data network 1506 interconnecting a plurality of participating devices in a communicating relationship including, e.g., a server 1502 and a client 1508. The data network 1506 may be any of the data networks described herein or otherwise known in the art.

The server 1502 may be any of the servers described herein. The server 1502 may be configured to generate extrusion paths from a digital representation of a three-dimensional model. The server 1502 may include a database 1504. The database 1504 may store a data structure 1518 for a number of digital representations of a three-dimensional model 1520. The database 1504 may also or instead store machine-ready models 1522 adapted for one of a number of types of three-dimensional printers each having a predetermined configuration. The server 1502 may be coupled to the database 1504 and coupled in a communicating relationship with a data network 1506. The server 1502 may be configured to respond to a request from a client 1508 to slice a three-dimensional model and convert it into a machine-ready model corresponding to a three-dimensional printer associated with the client 1508 and transmitting the one of the machine-ready models to the client 1508.

The client 1508 may be any of the client(s) described herein, for example, the client 1508 may be a three-dimensional printer with network capabilities, or the client 1508 may be another computing device such as a desktop computer, laptop computer, tablet, or the like locally coupled to a three-dimensional printer.

In one aspect, the server 1502 may be a web server that is configured to select and convert a three-dimensional model into extrusion paths for a three-dimensional printer. In an implementation, the server 1502 may provide a user interface 1510 via the data network 1506, e.g., for browsing among three-dimensional models 1520 stored in the database 1504. In order to facilitate the conversion in this manner, the server 1502 may detect a type of three-dimensional printer associated with the client 1508 in any of a number of ways. For example, if the client 1508 is a three-dimensional printer, the client 1508 may self-identify a type from local version information. Similarly, if the client 1508 is a desktop computer or other computing device locally coupled to the three-dimensional printer, the client 1508 may retrieve type information from the three-dimensional printer and provide this information to the server 1502. In another aspect, a user of the client 1508 may manually identify a type of three-dimensional printer and/or specific capabilities of the three-dimensional printer. Similarly, if the server 1502 is unable to determine a type of three-dimensional printer for the client 1508, the server 1502 may specifically request this information in the user interface 1510.

In another aspect, the client 1508 may interact with the server 1502 in an authenticated session where a user of the client 1508 provides login information. The server 1502 may store an association of the user with a particular printer or type of printer, and the server 1502 may use this server-side data to determine an association of the user or the client 1508 with a particular type of three-dimensional printer for the purposes of selecting a machine-ready model 1522 responsive to the user action. Where a client 1508 selects a three-dimensional model for conversion, the client 1508 may be configured to either send a request via the data network 1506 to the server 1502 to convert the three-dimensional model 1520 into an extrusion path, or to locally convert the three-dimensional model 1520 via software and hardware on the client 1508. The client 1508 may include a controller 1512, which may be operable to control the components of the three-dimensional printer, such as the x-y-z positioning assembly. The controller 1512 may be the controller 110 as discussed in connection with FIG. 1. The x-y-z positioning assembly may be what interprets the machine-ready model (extrusion paths) and prints a three-dimensional object based on the instructions. The x-y-z positioning assembly may include a gantry.

As described herein, the server 1502 may be configured to receive a digital model of an object through the data network 1506, and to create a number of machine-ready models 1522 for storage in the database 1504. The database 1504 may store any number of machine-ready models 1522 for any number of objects, and the server 1502 may provide a user interface 1510 (e.g., in a web browser) for browsing or searching objects and selecting an object (or a specific machine-ready model) for download.

In one aspect, the server 1502 and database 1504 may use a one-to-one mapping of machine-ready models 1522 to printer types so that a single model is deterministically selected for a three-dimensional printer. In this case, where no corresponding machine-ready model is available for the specific type of three-dimensional printer, the request from the client 1508 for a download or print may be denied by the server 1502. In another aspect, the server 1502 may include a slicing engine 1516 for carrying out the conversion of the three-dimensional model 1518 to the extrusion paths. It will be noted that the terms "extrusion path" and "machine ready code" are generally used interchangeably herein to refer to a spatial path that can be executed by a three-dimensional printer when extruding material to build an object. While the machine-ready code may include other information such as temperature, start and stop information, movement speed, and so forth, that is not specifically related to the extrusion path itself, these terms are intended to be used interchangeably unless another meaning is explicitly provided or otherwise clear from the context.

The slicing engine 1516 may employ various strategies, including without limitation a receiving strategy, a parsing strategy, a grouping strategy, an outline strategy, a processing strategy, a classification strategy, an optimization strategy, and a conversion strategy. These strategies are discussed in more detail in connection with the method 1600 of FIG. 16 herein. While a server-based embodiment is described herein, it will be appreciated that the slicing engine may be located on the client 1508, which may carry out the conversion locally or directly on a printer having a processor and/or controller with suitable processing capabilities. All such variations are intended to fall within the scope of this disclosure and corresponding implementations are well within the ordinary skill in the art. Thus, references to a server herein will be understood to include references to any computing device or printer that might similarly perform various computing tasks associated with the creation of machine ready code for fabricating an object.

The server 1502 may include a modification engine 1514. The modification engine 1514 may be configured to modify a selected one of the machine-ready models 1522 according to specific configuration information for the three-dimensional printer associated with the client 1508. The modification engine 1514 may in general be used to modify a pre-existing machine-ready model in the database 1504 as an alternative to storing multiple machine-ready models with minor variations. For example, if the three-dimensional printer includes a conveyor or other hardware to automatically remove a completed object from a build volume, the modification engine 1514 may add corresponding instructions to the machine-ready code delivered to the client 1508 for execution on the three-dimensional printer. Similarly, if the three-dimensional printer has multi-color printing capability and the model includes multi-color information (such as a texture map of surface colors), the modification engine 1514 may include suitable color change instructions in the machine-ready code. This may also include software-enabled features such as firmware upgrades or the like, and the server 1502 may detect such software-enabled features and where appropriate make modifications to the machine-ready code with the modification engine 1514. While certain capabilities or features may require an entirely different machine-ready model, other features may be accommodated with the simple addition or removal of a few lines of machine-ready code. In the latter context, the modification engine 1514 may usefully reduce the number of machine-ready models 1522 required for a wide range of printer configurations and capabilities. The slicing engine 1516 may include one or more of the features described herein to optimize the printing of the three-dimensional object based on the three-dimensional model 1520 and machine-ready code.

Figure 16:
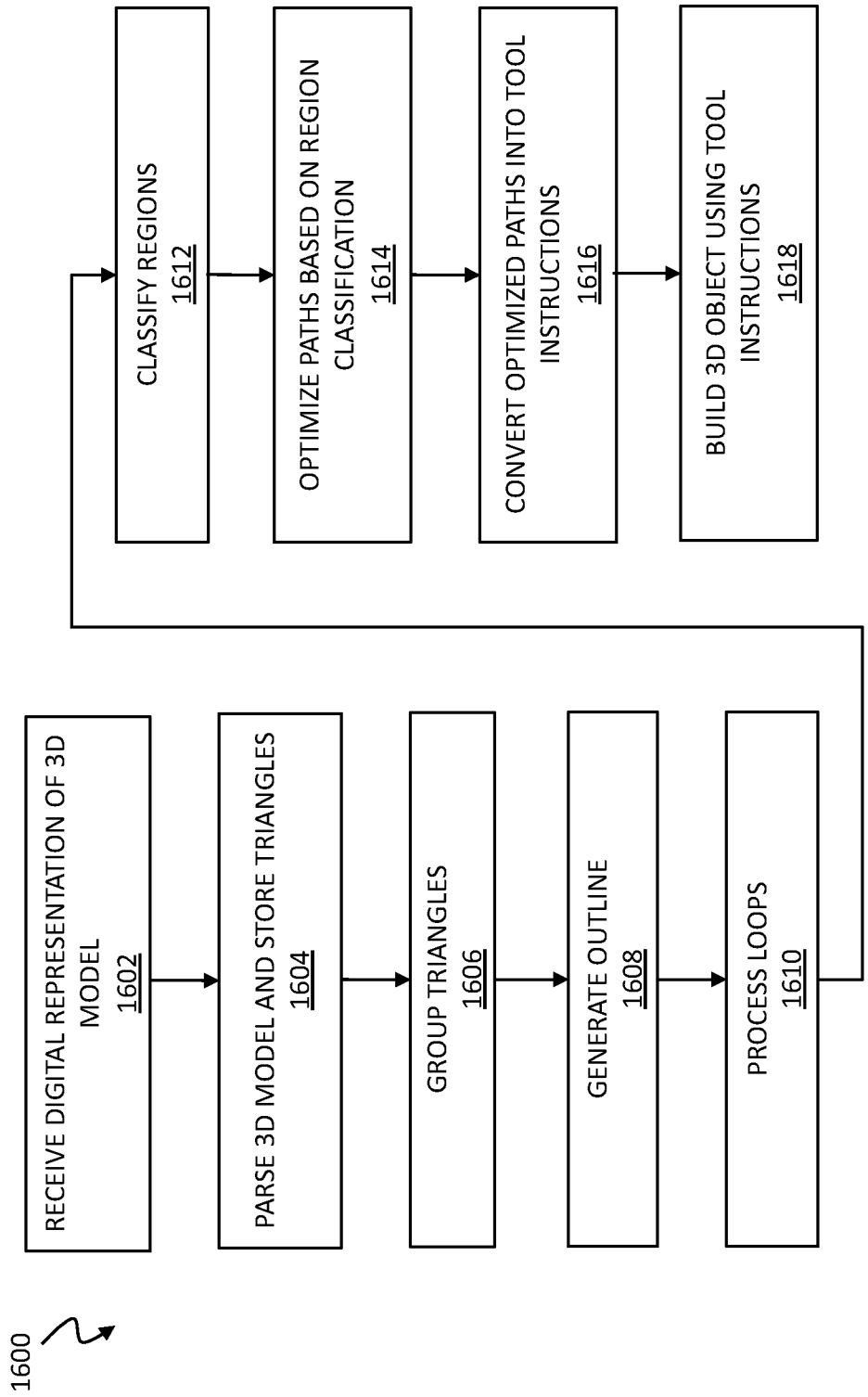
FIG. 16 is a flowchart of a method for generating extrusion paths and building a three-dimensional object based on a digital three-dimensional model.

FIG. 16 is a flowchart of a method for generating extrusion paths and building a three-dimensional object based on a digital three-dimensional model. Specifically, in the method 1600 of FIG. 16, the resulting three-dimensional object may be built on an easily removable raft. It will be understood that the method 1600 may be used for building three-dimensional objects and corresponding rafts having a variety of different geometries.

As shown in step 1602, the method 1600 may include receiving a digital representation of a three-dimensional model. For example, a digital three-dimensional model may include an STL ("stereolithography") file, a CAD ("computer aided design") file, or any other file format or the like for computerized representations of three-dimensional shapes. In some implementations, the file can be obtained from the output of a three-dimensional scanner, a three-dimensional modeling program, a database of three-dimensional models, or some combination of these. In general, any file or data structure describing a three-dimensional object that can be converted by a computer to printing instructions interpreted by the three-dimensional printer can be used. It will be noted that the techniques described herein may, for example, be usefully implemented in a processor that converts a three-dimensional model from an STL file to GCODE or any other machine-ready form. The model may be received through a data network. A request may be made from a client to begin the process which may take place on client computer or server coupled to the client computer via a network.

As shown in step 1604, the method 1600 may include parsing the three-dimensional model and storing triangle coordinates extracted from the three-dimensional model. The triangle coordinates may be extracted for storing in an array. For example, the triangle coordinates or "triangles" may be represented by the three-dimensional coordinates of their three points. The order of the points may determine which face of the triangle represents the inside direction of the three-dimensional model.

As shown in step 1606, the method 1600 may include grouping the triangles. For example, during this step 1606, the layers to which each triangle contributes may be determined.

As shown in step 1608, the method 1600 may include generating an outline once the triangles are grouped. During this step 1608, the triangles may be converted into collections of loops for each layer. This may be done, for example, by identifying a line segment where each triangle within the layer intersects a plane of the layer. The lines may be oriented according to the orientation of the triangle where it passes through the plane, and the resulting lines may be combined into loops.

As shown in step 1610, the method 1600 may include processing the loops, e.g., to simplify the two-dimensional outlines and remove detail that is finer than what can be printed. For example, approximately collinear points within a configurable error threshold may be combined. More generally, additional processing may be employed to restore continuity of the surface (e.g., repair non-manifold portions) and smooth the resulting path within the plane. The resulting outline(s) may represent an extent of an object to be printed (within the layer). The resulting outline may be used to directly create an extrusion path, or to create an inset for an extrusion path used to fabricate an object.

As shown in step 1612, the method 1600 may include classifying and generating different regions based on their location within the outline. The regions may, for example, include insets, roofs, floors, infills, supports, and rafts. Rafts may be used, e.g., to automatically level a build platform, or to reduce or prevent warping of an object and separation from a build platform during a print. Insets may define a surface of an object and contribute to the shape and the strength of the resulting build. Roofs and floors may be top and bottom surfaces respectively, corresponding to z-axis minima and maxima of a model. Infill may generally include structures enclosed within an exterior surface of an object to provide internal structural support, support for roofs, and so forth. Supports may generally include structures external to a model that are added to provide structural support during a print, such as for horizontal shelves or other shapes.

As shown in step 1614, the method 1600 may include optimizing paths based on the region classification. In other words, once the regions are generated and classified, an optimal way to traverse this output may be determined by step 1614. For example, during step 1614, objects may be extracted from the output of step 1612, and a path optimization strategy may be applied based upon, e.g., the classification and any other available information, to obtain an optimal path for traversing the layer of the model with an extrusion path. Optimization strategies may be modular and programmatically represented as subclasses of an optimizer class. In an embodiment, the goal of step 1614 is to find a way to traverse all elements of a layer in an optimal order. In one aspect, step 1614 creates open paths that go from the end vertex of one path to the start of the closest path.

Since there may be redundant vertices between the paths and the connections that link them, step 1614 may also remove these redundancies and then smooth or otherwise simplify the optimized path. These optimized paths may be paths that an extruder of a three-dimensional printer can take to optimally print a layer of a three-dimensional object based off of the digital three-dimensional model received in step 1602. A variety of general and class-specific optimization techniques are described in greater detail herein, and in the disclosures incorporated by reference herein.

As shown in step 1616, the method 1600 may include converting the optimally ordered extrusion paths into machine ready commands (i.e., tool instructions) that can be interpreted by the controller of the three-dimensional printer. The machine-ready commands may be GCODE or any command that can be interpreted by a three-dimensional printer.

As shown in step 1618, the method 1600 may include building a three-dimensional object based on the machine-ready commands.

Various steps of method 1600 may use one or more of the techniques described herein to optimally generate machine-ready code for building a three-dimensional object.

An implementation may use techniques described in MAKERBOT/WIKI, *Miracle Grue How It Works*, https://github.com/makerbot/wiki/wiki/Miracle-Grue-How-It-Works (as of Jun. 12, 2013), and/or MAKERBOT/WIKI, *Miracle Grue Runtime Complexity*, https://github.com/makerbot/wiki/wiki/Miracle-Grue-Runtime-Complexity (as of Jun. 12, 2013), where the entire contents of each is hereby incorporated by reference.

Techniques for printing layers having curves will now be discussed. Specifically, dynamic speed calculations, e.g., to allow slower gantry movements extruder movements around tight curves will now be discussed.

In one embodiment, while the object model is being sliced via methods described herein, the server, the client, or the like, may identify curves in each layer of the object. The created tool instructions may tell the x-y positioning assembly or the x-y-z positioning assembly (where either of which may include a gantry) of a three-dimensional printer to use slower speeds for moves within a curve. This can lead to improved printing of the object. While specific techniques are described herein, it will be understood that these approaches may be suitably deployed in a variety of ways, such as by using a first speed for all curves and a second (faster) speed for all straight line segments, or by adjusting speed substantially continuously according to a current radius of curvature for the path.

In one aspect, the toolpath may be expressed as a sequence of X, Y coordinate pairs. The toolpath may be expressed as a piecewise linear function:

$$x = P_x(d)$$
$$y = P_y(d), d \in [0, D]$$

where D is the total length f the toolpath.
Consider each window over the range of d $$[d_a, d_a + \varepsilon]$$

where $\varepsilon$ is the window length.
Within each window, the curvature C may be defined by:

$$C = \sum_{i=1}^{n} |\Theta(v_i)|$$

where Θ($v_i$) is the interior angle at vertex i, for each vertex 1 to n that falls inside the window.

A function for velocity may then be derived as:

$$V(d) = \begin{cases} s, s \in (0, 1) & \text{if } d \text{ falls in any window where } C > C_t \\ 1 & \text{otherwise} \end{cases}$$

where s is the slowdown ratio and $C_t$ is the curvature threshold.

A linear filter may then be applied to compute a smooth dynamic velocity at every point along the path, P, for example, as described in WIKIPEDIA, *Linear filter*, http://en.wikipedia.org/wiki/Linear_filter (as of Jun. 12, 2013), which is hereby incorporated by reference in its entirety.

Figure 17:
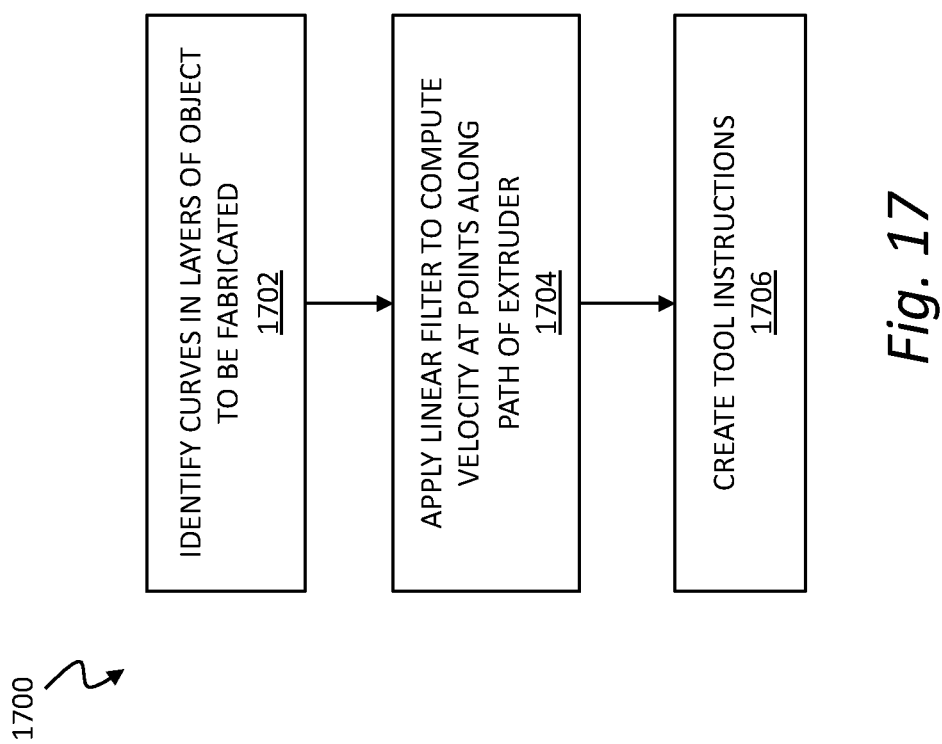
FIG. 17 is a flowchart of a method for operating a three-dimensional printer.

FIG. 17 is a flowchart of a method for operating a three-dimensional printer. The method 1700 may provide for speed control of the extruder and/or x-y positioning assembly according to the curvature of a layer of a three-dimensional object to be fabricated.

As shown in step 1702, the method 1700 may include identifying curves in layers of an object to be fabricated in a three-dimensional printing process. The three-dimensional printing process may include the use of a three-dimensional printer having a positioning assembly configured to move an extruder during the three-dimensional printing process for fabricating the object. The curves may be identified by the methods described herein, or as may be otherwise known in the art.

As shown in step 1704, the method 1700 may include applying a linear filter to compute a smooth dynamic velocity at points along a path (P) of the extruder.

As shown in step 1706, the method 1700 may include creating tool instructions for controlling the positioning assembly of the three-dimensional printer, where the tool instructions provide for slower speeds of the extruder within a curve having a radius within a predetermined range. The tool instructions may adjust the speed of the extruder substantially continuously according to a current radius of curvature for the path of the extruder. The tool instructions may utilize, e.g., the velocity function described herein, or other techniques that may be known in the art.

Techniques for printing spurs will now be discussed.

When creating paths for certain geometries, spurs may occur that include a single, open path instead of a closed loop. Spurs may occur, for example, when the area to be printed is so narrow that it is equal to a single filament width (as opposed to two filament widths as is required by a typical inset). For example, regions of a three-dimensional model can be defined by their outlines, and shells for an extrusion path may be created from an inset of the model outline, which can be obtained using conventional graphics techniques. After a shell has been defined, it may be outset by the same distance as the inset used to obtain the shell, thus resulting in a shell that more closely corresponds to the outline of the original model (with some details missing due to, e.g., smoothing and so forth). A difference between the shell outline and the original model outline results in so-called spur regions. Thus, in one aspect, a spur may be any two-dimensional region corresponding to a difference between a model outline and a shell of an extrusion path outline. Spurs may be an interior or an exterior inset. Because spurs are extensions of insets, they should obey the same ordering rules. When printing insets, spurs contained within each inset tree node may be traversed in the same manner as its children. This may naturally preserve the correct order.

Spur regions may be usefully filled to avoid printing artifacts associated with single thickness segments extended from a two-dimensional shape. The process may begin with spur outlines. An outline may be a polygon made from contiguous line segments. Opposing line segments may be identified by taking endpoints of each segment and testing which segments are closest to them. A list of wall pairs may be formed from this result, and the list may be filtered to remove certain pair configurations that produce undesirable results according to one or more rules. In general, each wall pair is adjacent to another wall pair if those pairs share a line segment, or if one segment of a pair shares an endpoint with one segment of the other pair. Wall pairs can also be bisected. Two segments of a pair may be projected out until they intersect and a triangle may be formed. By placing a base on this triangle equal to a minimum spur width (the narrowest space that a spur can fit through according to a predetermined design rule), and another base of length equal to the maximum spur width (the largest width before a spur becomes a shell), then finding the midpoint of those two bases, a line connecting these two respective midpoints may provide a bisection of a wall pair.

Once adjacent wall pairs have been identified and bisected, the resulting bisections for a number of wall pairs may be chained. A chain may be started, for example, by choosing a wall pair to start with, bisecting it, and making one endpoint of the bisection the first point in the chain. A number of adjacent wall pairs may then be located and bisected. If there is a single bisection that intersects the current bisection it may be chained directly. If there are a number of bisections, the bisections may be ranked using a heuristic, and the highest ranking intersection point may be added to a current chain. At the same time, the corresponding wall pair may become the current wall pair and the process may repeat until there are no adjacent, intersecting bisections. At this point, the chain may be ended with an endpoint of the last bisection.

This process may be repeated with a new, unused wall pair serving as a new starting point for a new chain until there are no unused wall pairs left, at which point the process may conclude.

Figure 18:
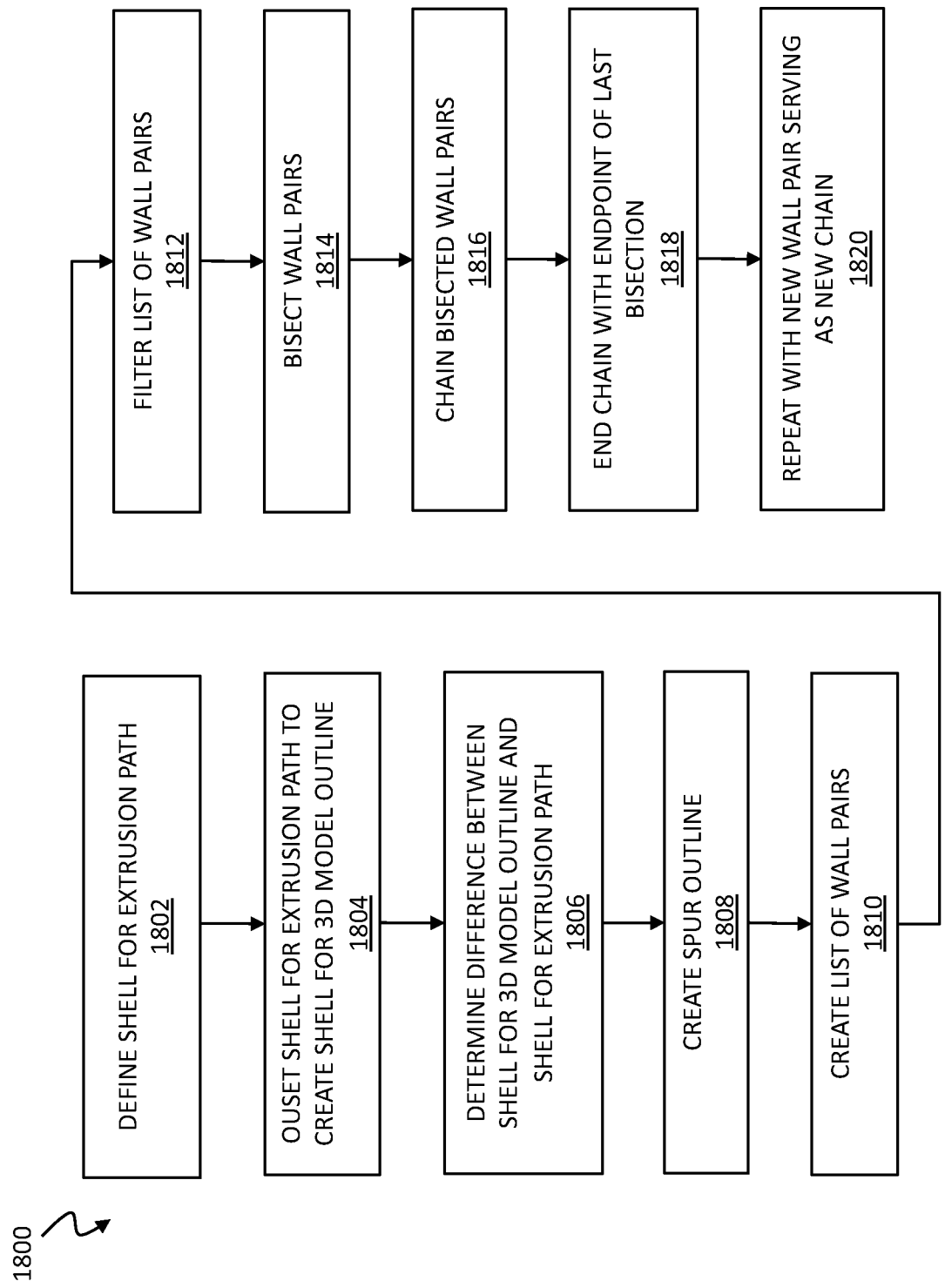
FIG. 18 is a flowchart of a method for identifying and printing spurs.

FIG. 18 is a flowchart of a method for identifying and printing spurs.

As shown in step 1802, the method 1800 may include defining a shell for an extrusion path from an inset of a three-dimensional model outline.

As shown in step 1804, the method 1800 may include outsetting the shell by a distance equal to the inset used to define the shell, thereby creating a shell that corresponds to the three-dimensional model outline.

As shown in step 1806, the method 1800 may include determining a difference between the shell that corresponds to the three-dimensional model outline and the shell for the extrusion path to determine spur regions.

As shown in step 1808, the method 1800 may include creating a spur outline made from line segments.

As shown in step 1810, the method 1800 may include creating a list of wall pairs by testing the line segments.

As shown in step 1812, the method 1800 may include filtering the list to remove certain pair configurations that produce undesirable results according to one or more rules.

As shown in step 1814, the method 1800 may include bisecting the wall pairs.

As shown in step 1816, the method 1800 may include chaining the bisected wall pairs.

As shown in step 1818, the method 1800 may include ending the chain with an endpoint of a last bisection.

As shown in step 1820, the method 1800 may include repeating the above steps with a new, unused wall pair serving as a new starting point for a new chain until there are no unused wall pairs left.

Techniques for smoothing will now be discussed.

In one aspect, smoothing may be performed on individual, two-dimensional layers of an extrusion path. In general, smoothing may be performed on a three-dimensional model prior to the creation of machine-ready code. However, smoothing may also or instead be performed by the slicing engine as described herein when creating an extrusion path.

Iterative smoothing techniques may be improved in this context by prioritizing smoothing with an error-based ranking function. For example, outlines may be composed of segments, e.g., line segments. The line segments may be combined in order to see ageometric error that occurs. The purpose of this may be to remove the vertex. The vertices may be ranked based on error. The smaller errors may be removed first. The smoothing may end when there is no more error below a certain threshold.

In one aspect, topological smoothing may be achieved using energy minimization techniques. For example, one technique uses a set of elementary transformations (e.g., edge collapse, edge split, and edge swap) that are applied, e.g., randomly and accepted whenever an energy function, E(K), is reduced as a result. This technique is described for example in Hoppe, et al., *Mesh Optimization*, COMPUTER GRAPHICS (SIGGRAPH '93 Proceedings) Annual Conference Series, 27, No. 3, August 1993, 19-26, ¶4.2 (available at http://www.stat.washington.edu/wxs/Siggraph-93/siggraph93.pdf (as of Jun. 12, 2013)), which is hereby incorporated by reference in its entirety. Hoppe, et al. describes a set of moves for applying such elementary transformations to a boundary edge or vertex of a shape.

Figure 19:
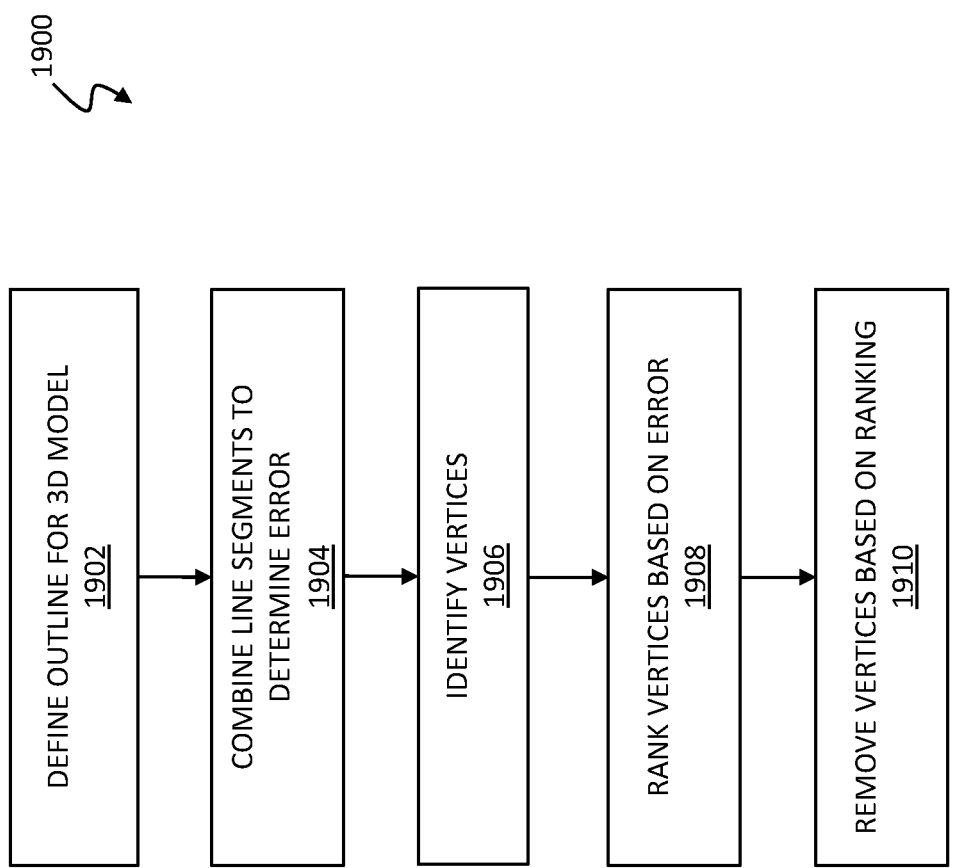
FIG. 19 is a flowchart for smoothing in a three-dimensional printing process.

FIG. 19 is a flowchart for smoothing in a three-dimensional printing process.

As shown in step 1902, the method 1900 may include defining an outline for a three-dimensional model, the outline including line segments.

As shown in step 1904, the method 1900 may include combining the line segments to determine a geometric error.

As shown in step 1906, the method 1900 may include identifying vertices.

As shown in step 1908, the method 1900 may include ranking the vertices based on the error.

As shown in step 1910, the method 1900 may include removing the vertices based on the ranking.

Many of the above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory, any of which may serve as the controller described above or supplement processing of the controller with additional circuitry. This may also, or instead, include one or more application specific integrated circuits, programmable gate arrays, programmable array logic components, or any other device(s) that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

In other embodiments, disclosed herein are computer program products comprising computer-executable code or computer-usable code that, when executing on one or more computing devices (such as the devices/systems described above), performs any and/or all of the steps described above. The code may be stored in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the processes described above may be embodied in any suitable transmission or propagation medium carrying the computer-executable code described above and/or any inputs or outputs from same.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. Thus, the order or presentation of method steps in the description and drawings above is not intended to require this order of performing the recited steps unless a particular order is expressly required or otherwise clear from the context.

While particular embodiments of the present invention have been shown and described, it will be apparent to those skilled in the art that various changes and modifications in form and details may be made therein without departing from the spirit and scope of the invention. The features of the invention as described herein should be interpreted in the broadest sense allowable by law.

Improvements to three-dimensional printers, and systems and/or methods of using such three-dimensional printers, and/or structures fabricated using such three-dimensional printers are described below in various non-limiting examples. These exemplary embodiments may generally be deployed in combination with any of the systems and methods disclosed above, or any similar suitably similar fabrication platforms, or in any other context that would be apparent to one of ordinary skill in the art, and all such uses and variations are intended to fall within the scope of this disclosure.

What is claimed is:

1. A computer program product for operating a three-dimensional printer comprising non-transitory computer executable code embodied in a non-transitory computer-readable medium that, when executing on one or more computing devices, performs the steps of:
    determining a processing height for depositing each of a plurality of layers in a three-dimensional print;
    fabricating a support for an object in the three-dimensional print including fabricating a top layer of the support on a plurality of intermediate layers of the support, the top layer fabricated at a distance from an underlying intermediate layer no greater than the processing height;
    fabricating an initial layer of the object on the top layer of the support with an exit port of an extruder at a first height, wherein the initial layer is extruded at a distance from the top layer greater than the processing height; and
    fabricating a subsequent layer of the object on the initial layer of the object, wherein the subsequent layer is extruded at a distance not exceeding twice the processing height from the top layer of the support such that the extruder is closer to the initial layer of the object when forming the subsequent layer of the object than the extruder was to the top layer of the support when forming the initial layer of the object, thereby forming a relatively strong bond between the initial layer of the object and the subsequent layer of the object.

2. The computer program product of claim 1, wherein the support includes a raft.

3. The computer program product of claim 1, wherein the support includes a structure providing elevated support for at least a portion of the object.

4. The computer program product of claim 3, wherein the portion of the object includes a horizontal shelf or overhang.

5. The computer program product of claim 3, wherein the structure providing elevated support is distinct from a raft.

6. The computer program product of claim 1, further comprising non-transitory code that performs the step of fabricating a plurality of additional layers on the subsequent layer of the object, each one of the additional layers extruded at a distance about equal to the processing height from a preceding layer.

7. The computer program product of claim 1, wherein the initial layer of the object is extruded at a distance of about twice the processing height from the top layer of the support.

8. The computer program product of claim 1, further comprising non-transitory code that performs the step of fabricating the plurality of intermediate layers of the support, each of the plurality of intermediate layers deposited according to a pattern that is rotationally offset from that of an immediately adjacent intermediate layer.

9. The computer program product of claim 8, wherein a base layer of the support includes a rectilinear pattern including a plurality of segments, each one of the plurality of segments having a length below a threshold length selected to avoid warping of the base layer away from a build platform.

10. The computer program product of claim 9, wherein the plurality of intermediate layers and the top layer are disposed at progressively changing orientations relative to the base layer.

11. The computer program product of claim 1, wherein the top layer of the support is formed of a plurality of segments spaced apart by an amount below a threshold spacing selected to reduce drooping of the initial layer of the object between each of the plurality of segments.

12. The computer program product of claim 1, wherein the processing height is about 0.20 millimeters.

13. The computer program product of claim 12, wherein the initial layer of the object is extruded at a distance at least 0.23 millimeters greater than the processing height above the top layer of the support.

14. The computer program product of claim 12, wherein the initial layer of the object is extruded at a distance at least 0.35 millimeters greater than the processing height above the top layer of the support.

15. The computer program product of claim 1, wherein the top layer of the support is fabricated with a first material and the initial layer of the object is fabricated with a second material different than the first material.

16. The computer program product of claim 1, wherein each of the plurality of layers in the three-dimensional print is fabricated using a build material, and wherein the build material includes one or more of polylactic acid and acrylonitrile butadiene styrene.

17. The computer program product of claim 1, wherein the initial layer is extruded at the distance from the top layer of the support greater than the processing height through at least control of one or more of a volumetric flow rate and speed of extrusion.

18. The computer program product of claim 1, further comprising non-transitory code that performs the step of directing air at a variable flow rate toward layers of the three-dimensional print as the layers are being fabricated, wherein the variable flow rate increases from a first rate used while fabricating the support to a second rate as the initial layer of the object is being fabricated.

19. The computer program product of claim 18, wherein the air is directed toward the layers using a cooling fan and duct.

20. A system comprising:
    a three-dimensional printer having an extruder; and
    processing circuitry associated with the three-dimensional printer and configured to determine a processing height for depositing each of a plurality of layers in the three-dimensional print, to fabricate a first layer of the three-dimensional print at a distance from an underlying layer substantially equal to the processing height to form a support structure for an object, to fabricate a second layer of the three-dimensional print on the support structure to form an initial layer of the object, wherein the second layer is extruded at a distance from a top of the first layer greater than the processing height, and to fabricate a third layer of the three-dimensional print on the initial layer of the object, wherein the third layer is extruded at a distance not exceeding twice the processing height from the support structure, thereby forming a relatively strong bond between the second layer and the third layer.

* * * * *